(12) United States Patent
Hayashi et al.

(10) Patent No.: US 10,782,783 B2
(45) Date of Patent: Sep. 22, 2020

(54) DISPLAY DEVICE

(71) Applicant: Japan Display Inc., Minato-ku, Tokyo (JP)

(72) Inventors: Shuji Hayashi, Tokyo (JP); Keiji Takizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 183 days.

(21) Appl. No.: 15/798,582

(22) Filed: Oct. 31, 2017

(65) Prior Publication Data

US 2018/0136730 A1     May 17, 2018

(30) Foreign Application Priority Data

Nov. 11, 2016     (JP) ................... 2016-220794

(51) Int. Cl.
| | | |
|---|---|---|
| *G06F 3/01* | (2006.01) | |
| *G06F 3/03* | (2006.01) | |
| *G02B 30/25* | (2020.01) | |
| *G02B 30/56* | (2020.01) | |
| *G02B 5/12* | (2006.01) | |
| *G06F 3/042* | (2006.01) | |
| *G06F 3/16* | (2006.01) | |

(Continued)

(52) U.S. Cl.
CPC ............. *G06F 3/016* (2013.01); *G02B 5/12* (2013.01); *G02B 30/25* (2020.01); *G02B 30/56* (2020.01); *G06F 3/011* (2013.01); *G06F 3/0304* (2013.01); *G06F 3/0421* (2013.01); *G06F 3/165* (2013.01); *H04R 1/028* (2013.01); *G02F 1/133385* (2013.01); *G06F 3/167* (2013.01); *G06F 2203/04108* (2013.01); *H04R 2499/15* (2013.01)

(58) Field of Classification Search
CPC ........ G06F 3/016; G06F 3/0304; G06F 3/011; G06F 3/0421; G06F 3/165; G06F 3/167; G06F 2203/04108; G06F 3/041–047; G06F 2203/013–015; G06F 2203/041–04114; G02B 27/26; G02B 5/12; G02B 27/2292; G02B 30/25; G02B 30/56; G02F 1/133385; G02F 1/13338; G02F 1/133553; H04R 2499/15; H04R 1/028

See application file for complete search history.

(56) References Cited

U.S. PATENT DOCUMENTS 6,318,868 B1 *   11/2001   Larussa ............... G02B 27/2292
                                              359/630
8,410,916 B1 *   4/2013   Camoriano Gladson ....................
                                              G06F 3/016
                                              116/205

(Continued)

FOREIGN PATENT DOCUMENTS

JP      2011-253128       12/2011

*Primary Examiner* — Roberto W Flores
(74) *Attorney, Agent, or Firm* — Oblon, McClelland, Maier & Neustadt, L.L.P.

(57) ABSTRACT

According to one embodiment, a display device includes a display which emits display light, a retroreflective element which retroreflects incident light, an optical element including a lower surface opposing the display and the retroreflective element and an upper surface on an opposite side to the lower surface, which reflects part of the display light toward the retroreflective element and transmits reflection light retroreflected by the retroreflective element and a first blower mechanism which blows air to a side of the upper surface.

7 Claims, 21 Drawing Sheets

(51) Int. Cl.
*H04R 1/02* (2006.01)
*G02F 1/1333* (2006.01)

(56) References Cited

U.S. PATENT DOCUMENTS

| | | | | |
|---|---|---|---|---|
| 9,092,953 | B1* | 7/2015 | Mortimer | G06F 3/016 |
| 2007/0085820 | A1* | 4/2007 | Suzuki | G06F 3/016 |
| | | | | 345/156 |
| 2010/0110384 | A1* | 5/2010 | Maekawa | G02B 5/124 |
| | | | | 353/10 |
| 2010/0302015 | A1* | 12/2010 | Kipman | G06F 3/011 |
| | | | | 340/407.1 |
| 2011/0116016 | A1* | 5/2011 | Mikubo | G02F 1/133308 |
| | | | | 349/70 |
| 2012/0169586 | A1* | 7/2012 | Mitchell | G02B 27/22 |
| | | | | 345/156 |
| 2012/0280920 | A1* | 11/2012 | Jackson | G06F 3/016 |
| | | | | 345/173 |
| 2015/0015607 | A1* | 1/2015 | Sodhi | G06F 3/016 |
| | | | | 345/633 |
| 2015/0277610 | A1* | 10/2015 | Kim | G06F 3/016 |
| | | | | 345/173 |
| 2016/0291715 | A1* | 10/2016 | Kim | G06F 3/042 |
| 2018/0107276 | A1* | 4/2018 | Heubel | G06F 3/04883 |

* cited by examiner

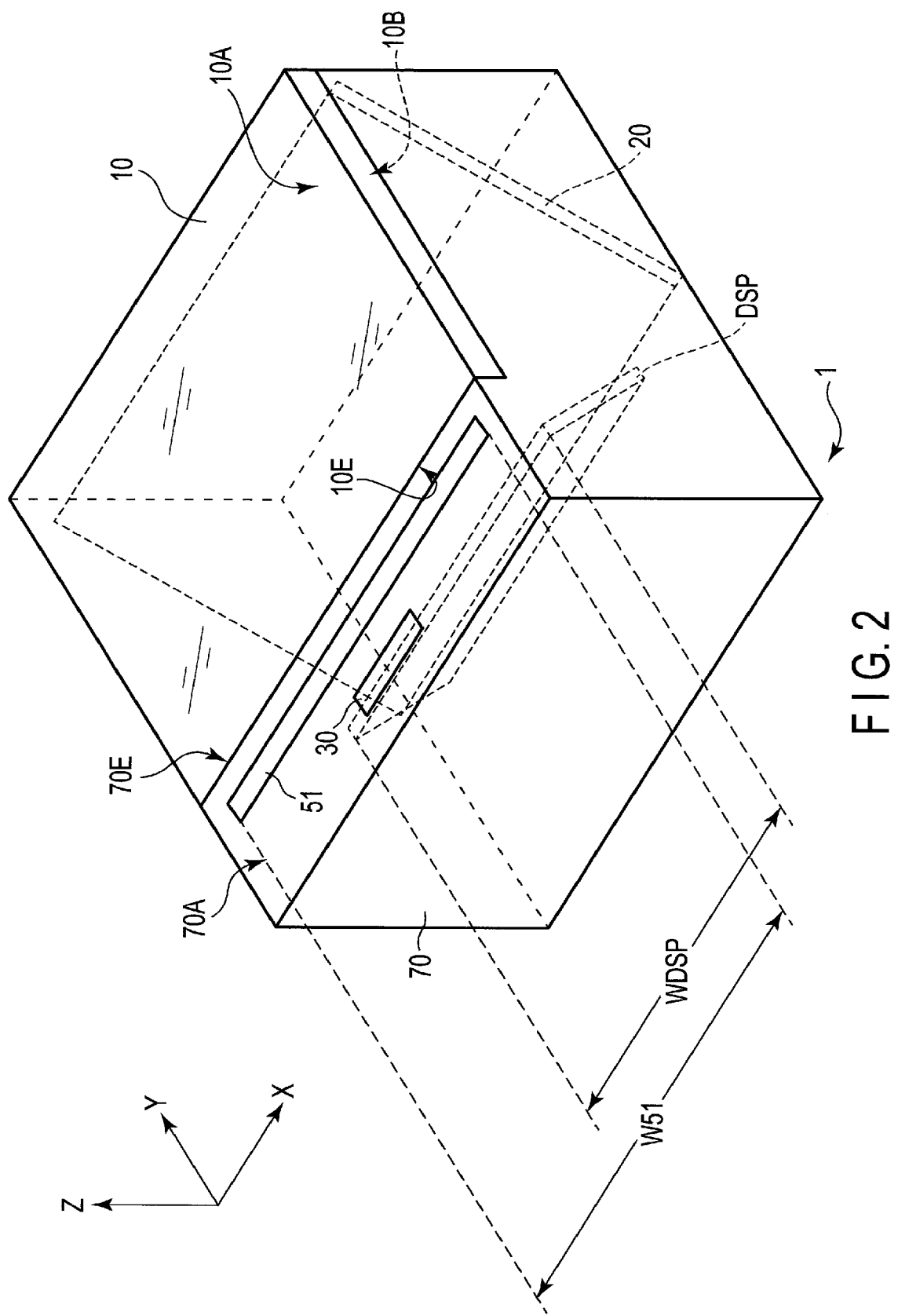
F I G. 2

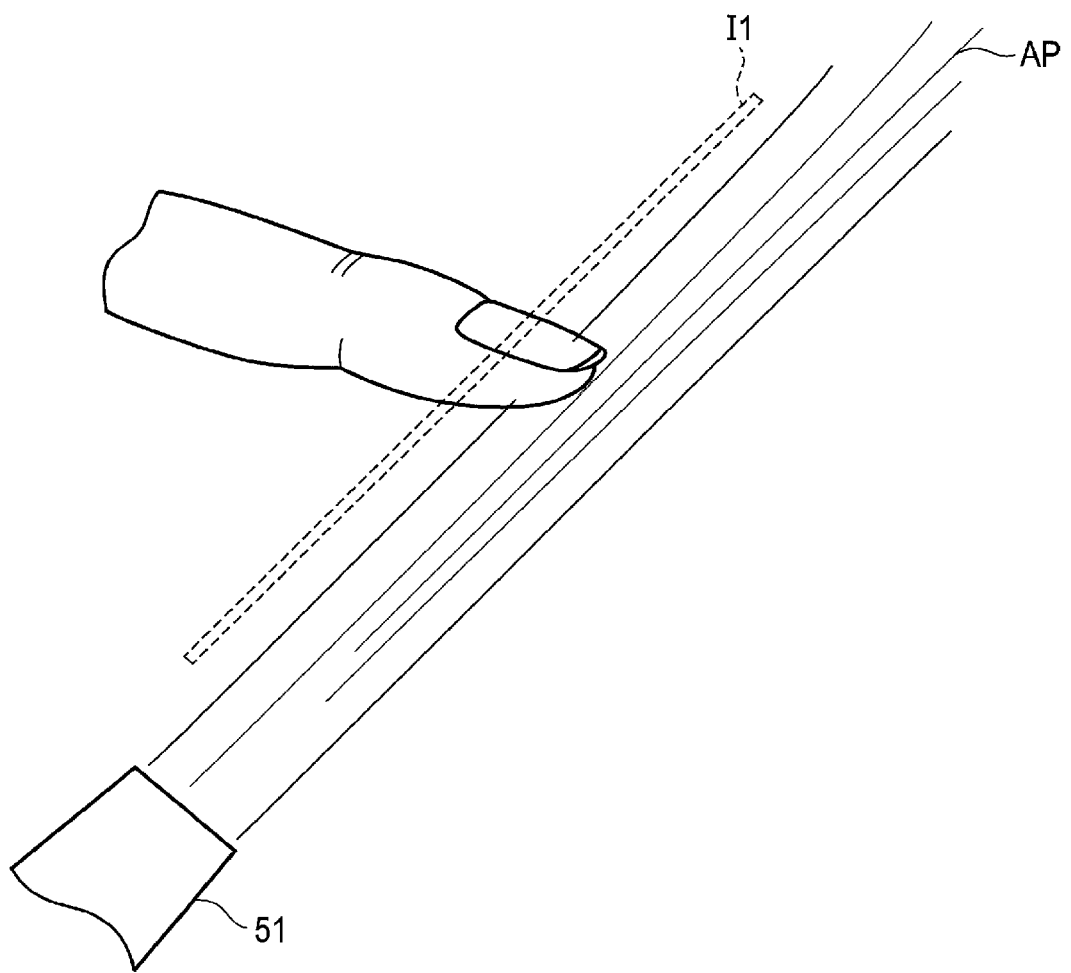
F I G. 6B

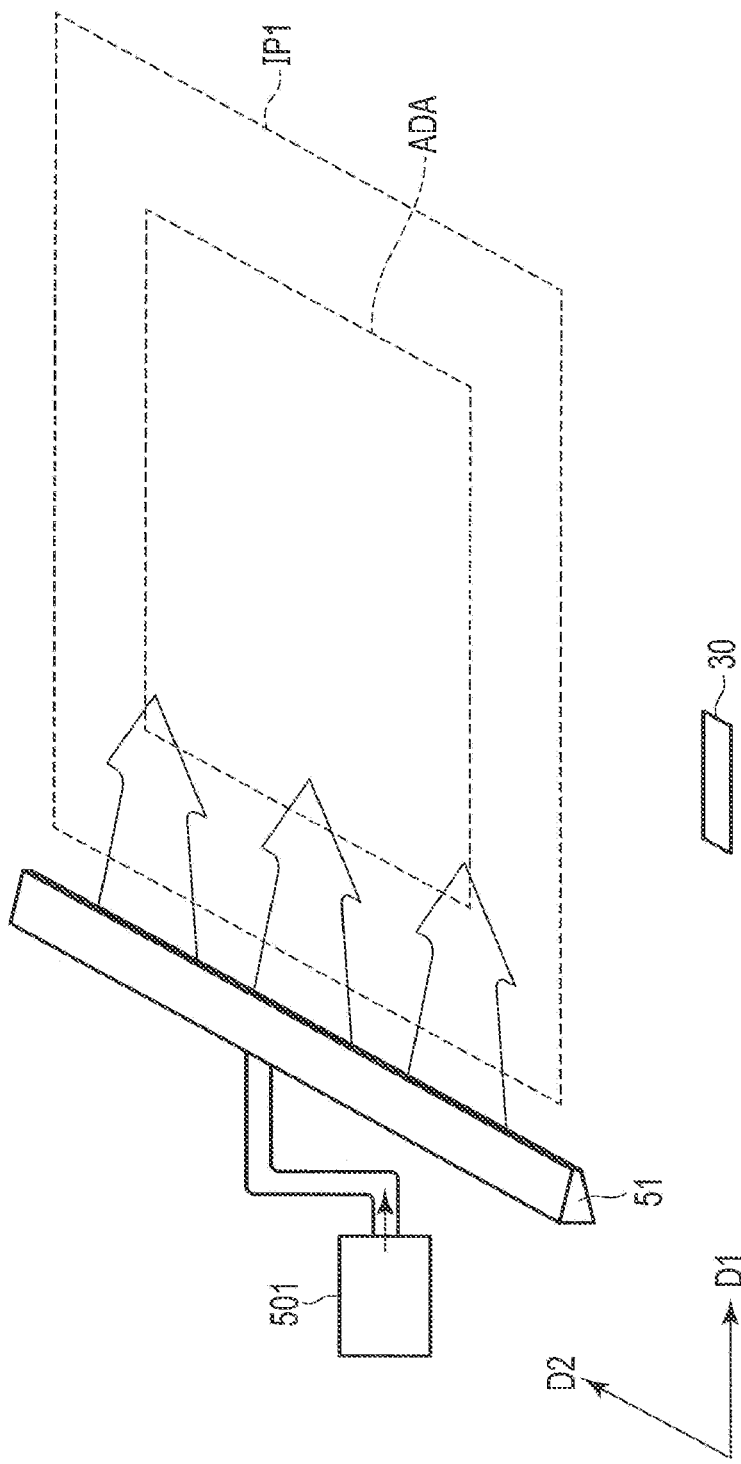
F I G. 10

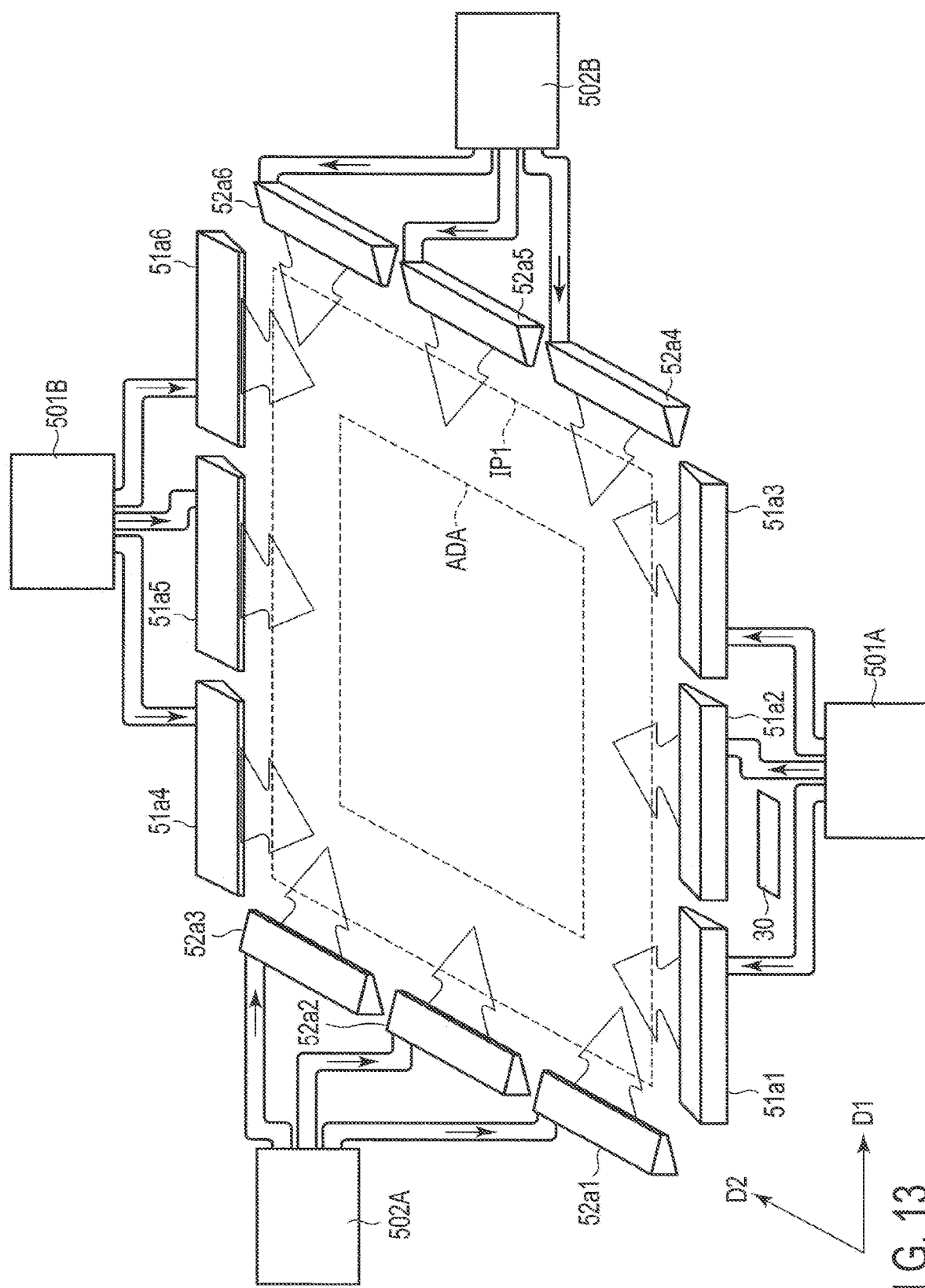
F I G. 13

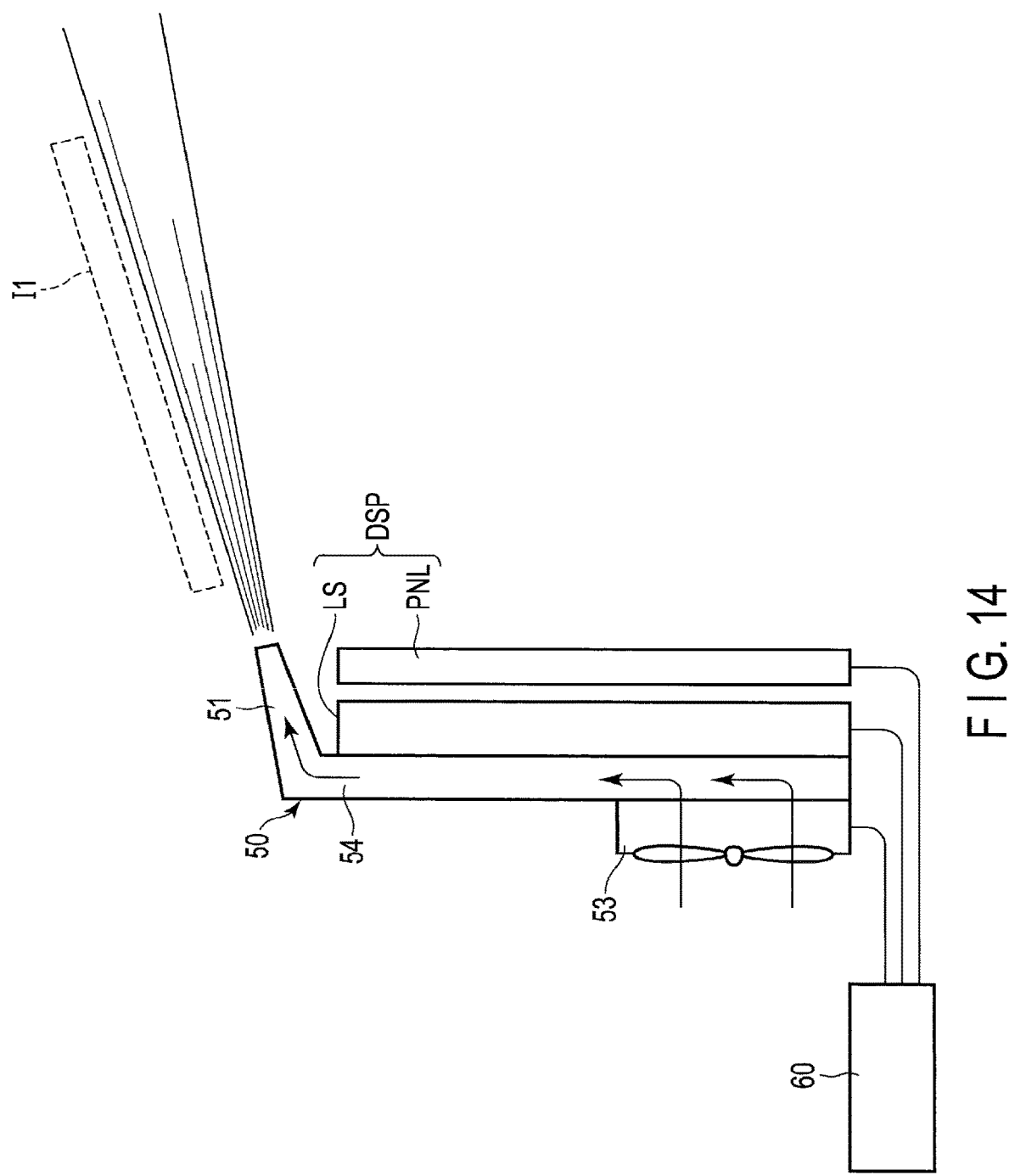
F I G. 14

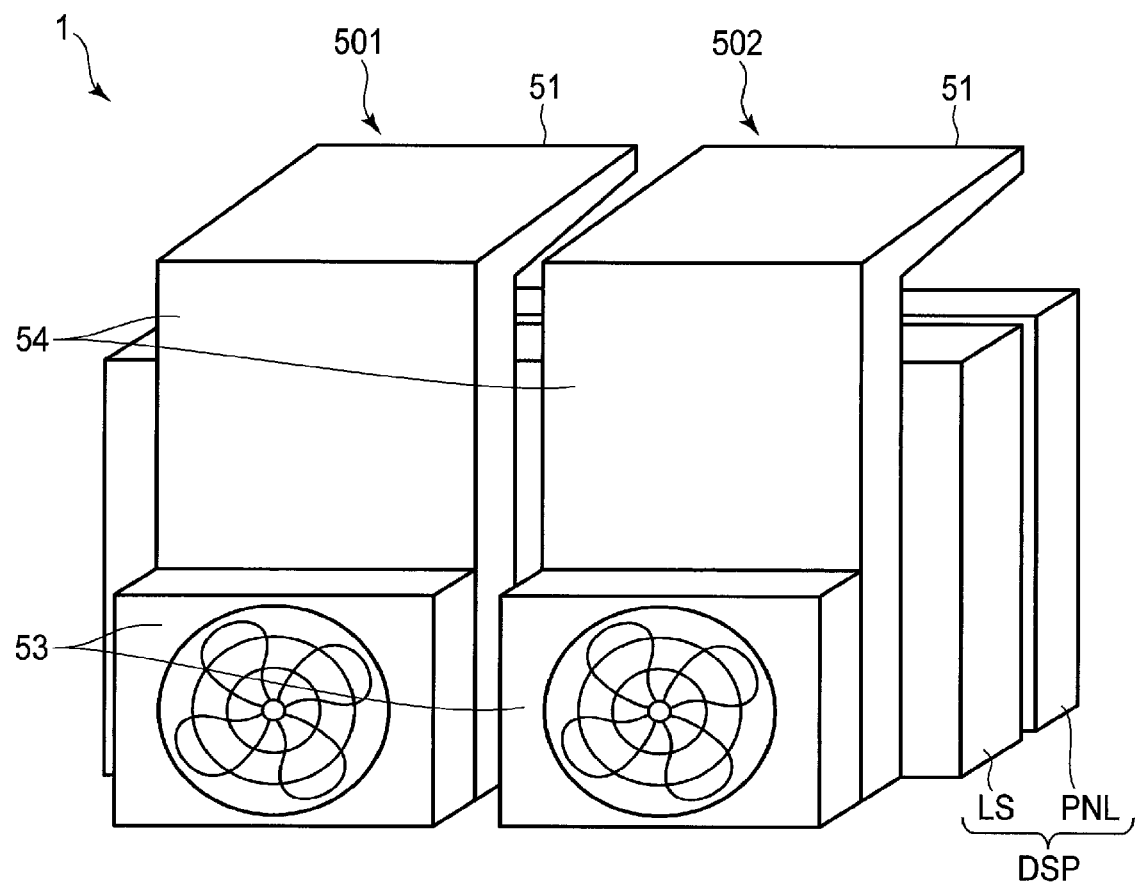
F I G. 15

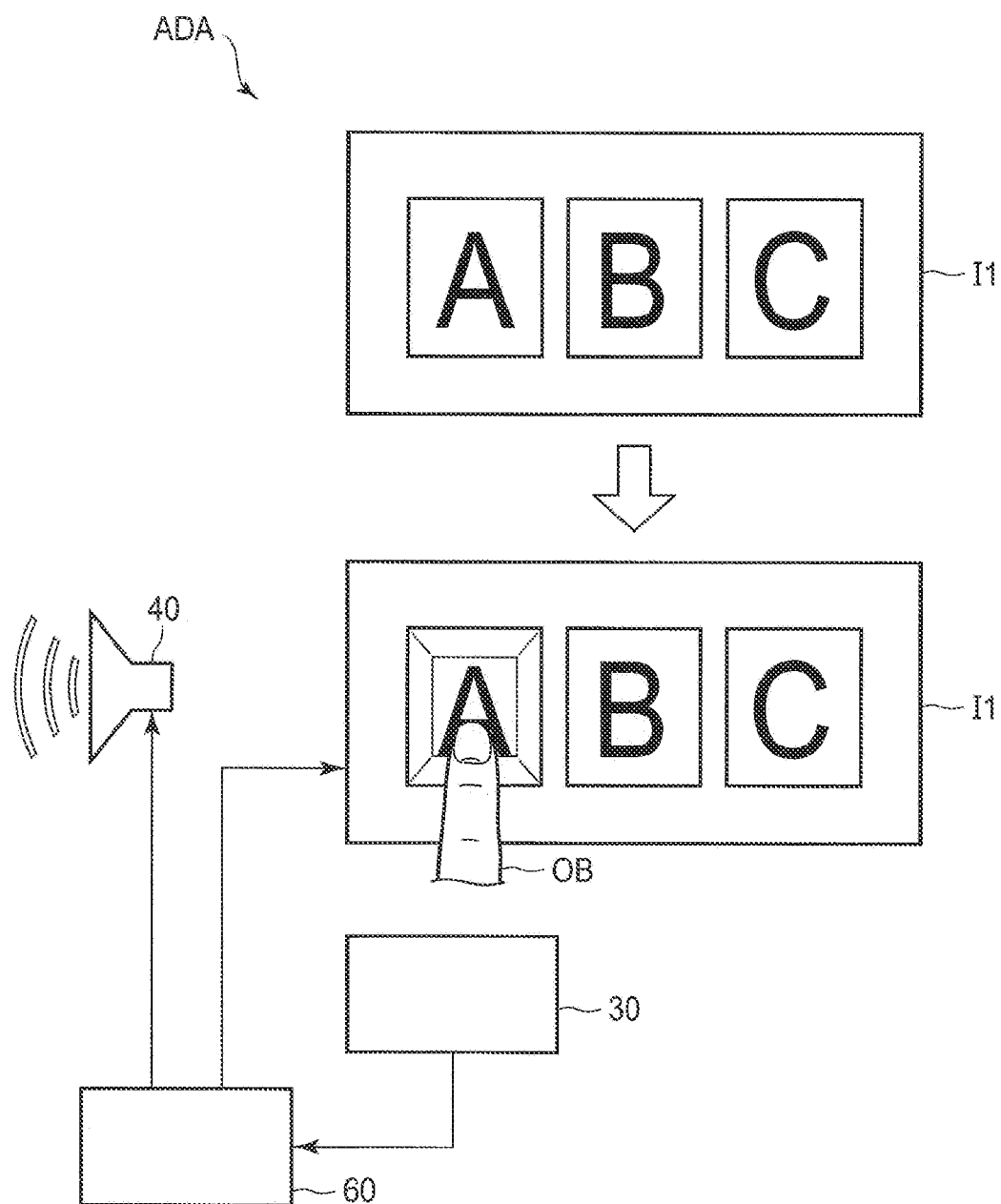
F I G. 16

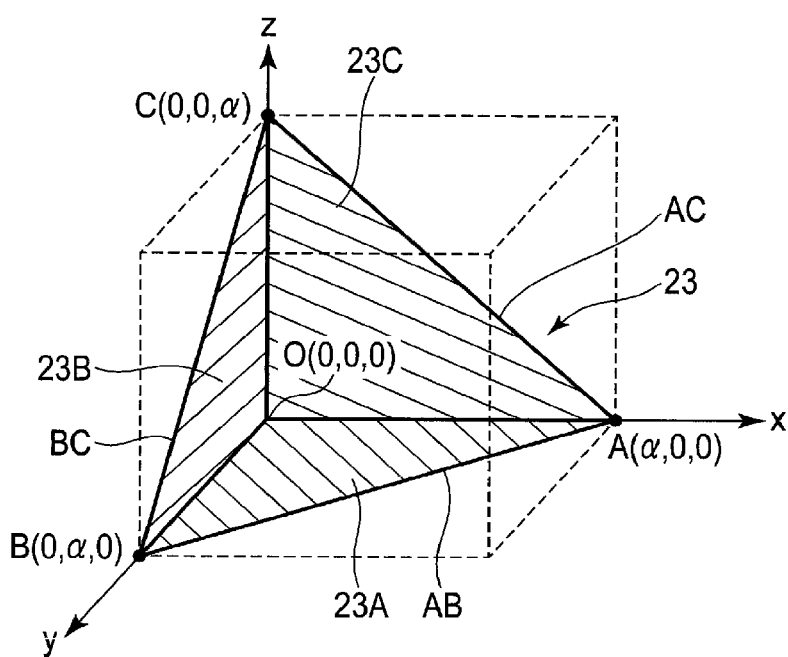
F I G. 20

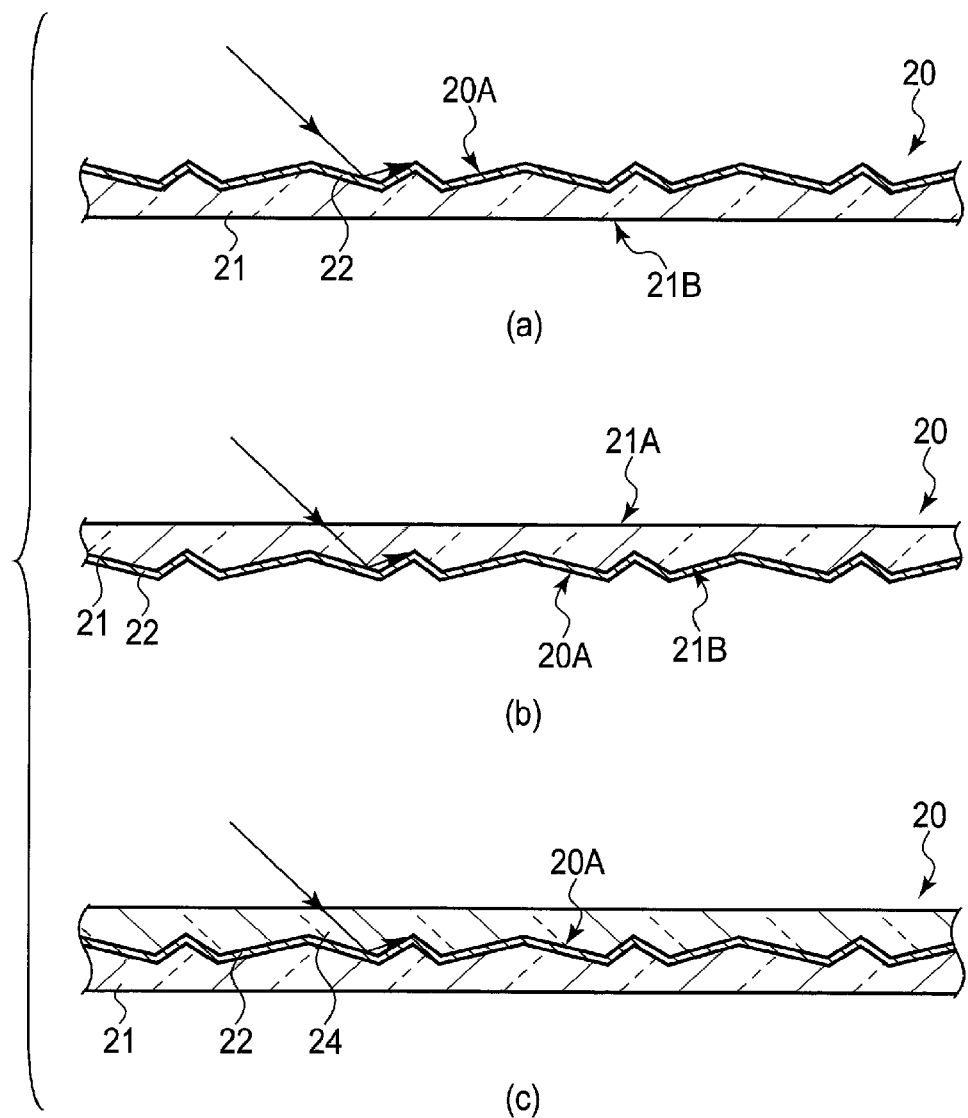
F I G. 21

DISPLAY DEVICE

CROSS-REFERENCE TO RELATED APPLICATIONS

This application is based upon and claims the benefit of priority from Japanese Patent Application No. 2016-220794, filed Nov. 11, 2016, the entire contents of which are incorporated herein by reference.

FIELD

Embodiments described herein relate generally to a display device.

BACKGROUND

An imaging device comprising, for example, a polarizing filter and a retroreflective element has been proposed. The imaging device forms aerial images at a position planesymmetrical to an emission point of display light showing the images to be displayed with regard to the polarizing filter. Here, when an observer tries to touch an aerial image in simulation, it is difficult for the observer to acquire the feeling of "touching" the aerial image. Under these circumstances, there is a demand for establishing the technique which enables an observer to sense the feeling of touching aerial images.

BRIEF DESCRIPTION OF THE DRAWINGS

FIG. 2 is a diagram showing an example of an appearance of the display device.

FIG. 6B is a diagram schematically showing a state that an observer's finger is touching an air plate.

FIG. 10 is a diagram showing another example of arrangement of the air blower outlet.

FIG. 13 is a diagram showing another example of arrangement of the air blower outlet.

FIG. 14 is a diagram schematically showing a blower mechanism.

FIG. 15 is a perspective view schematically showing a display device comprising the blower mechanism shown in FIG. 14.

FIG. 16 is a diagram showing an example of an aerial image displayed on an aerial display area.

FIG. 20 is a perspective view showing a configuration example of a retroreflector shown in FIG. 19.

FIG. 21 is a cross section showing a configuration example of a retroreflective element applicable to this embodiment.

DETAILED DESCRIPTION

Figure 1:
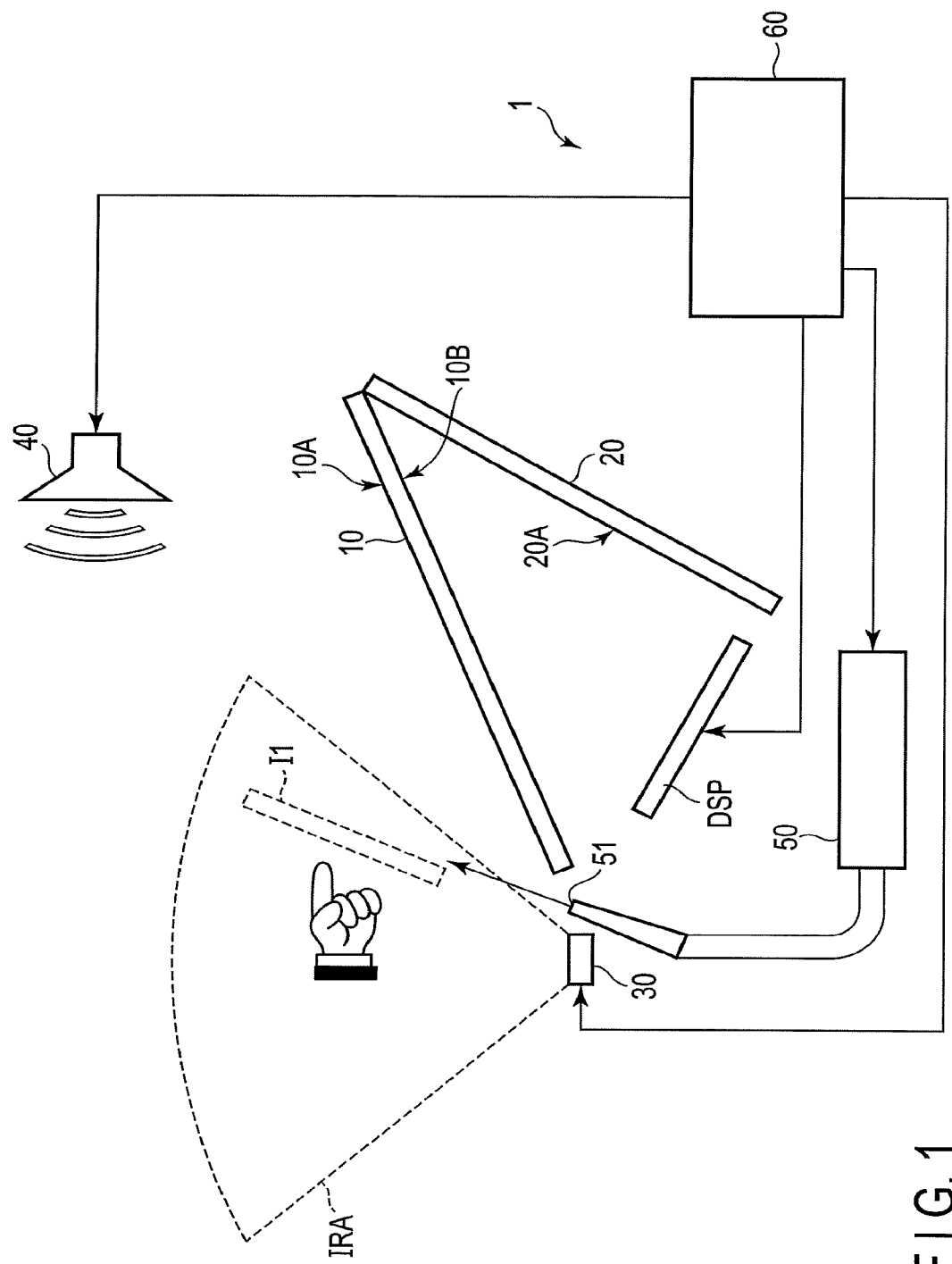
FIG. 1 is a diagram showing a configuration example of a display device according to an embodiment.

In general, according to one embodiment, a display device comprises a display which emits display light, a retroreflective element which retroreflects incident light, an optical element comprising a lower surface opposing the display and the retroreflective element and an upper surface on an opposite side to the lower surface, which reflects part of the display light toward the retroreflective element and transmits reflection light retroreflected by the retroreflective element and a first blower mechanism which blows air to a side of the upper surface.

According to another embodiment, a display device comprises a display which emits display light, a retroreflective element which retroreflects incident light, an optical element comprising a lower surface opposing the display and the retroreflective element and an upper surface on an opposite side to the lower surface, which reflects part of the display light toward the retroreflective element and transmits reflection light retroreflected by the retroreflective element and an air plate located on an upper surface side and formed from airflow.

According to another embodiment, a display device comprises a display which emits display light, a retroreflective element which retroreflects incident light, an optical element comprising a lower surface opposing the display and the retroreflective element and an upper surface on an opposite side to the lower surface, which reflects part of the display light toward the retroreflective element and transmits reflection light retroreflected by the retroreflective element, a sensor which detects an object to be detected, located on the upper surface side and a blower mechanism comprising an air blower outlet between the sensor and the optical element.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a diagram showing a configuration example of a display device 1 according to an embodiment.

The display device 1 comprises a display DSP, an optical element 10, a retroreflective element 20, a sensor 30, a loudspeaker 40, a blower mechanism 50, a controller 60 and the like.

The structure of the display DSP is not particularly limited as long as it is able to emit display light. An example of the display DSP is a liquid crystal display in which a liquid crystal layer is held between a pair of substrates. But, the display DSP may be a self-luminous display device such as an organic electroluminescent display device, an electronic paper display device comprising an electrophoretic element, and the like, a display device employing micro-electromechanical systems (MEMS), or a display device employing electrochromism. Specific examples of the display DSP will be described later.

The optical element 10 reflects at least part of incident light and transmits part the incident light. The optical elements 10 may be a half mirror having equal reflectivity and transmissivity to incident light, a polarization beam splitter, a reflective polarizer, a wire grid polarizer, or the like. The optical element 10 comprises a lower surface 10B on a side opposing the display DSP and the retroreflective element 20, and an upper surface 10A on an opposite side to the lower surface 10B.

The retroreflective element 20 retroreflects incident light. That is, the retroreflective element 20 reflects incident light made incident on a retroreflective surface 20A to an opposite direction parallel to that of the incident light. The display DSP and the retroreflective element 20 are located on a side opposing the lower surface 10B. The details of the retroreflective element 20 will be provided later.

In the display device 1, display light emitted from the display DSP is imaged as an aerial image I1 on an upper surface 10A side as will be explained in detail with reference to FIG. 3.

The sensor 30 is an infrared sensor, for example, and detects an object to be detected, such as a finger, in a detection range IRA indicated with a dotted line. The detection range IRA includes the region where the aerial image I1 is imaged.

The loudspeaker 40 outputs sound. There may be a plurality of loudspeakers 40.

The blower mechanism 50 comprises an air blower outlet 51 which blows air to the upper surface 10A side. The blower mechanism 50 blows air in the direction parallel to the aerial image I1 between, for example, the aerial image I1 and the optical element 10. The blower mechanism 50 may comprise a flow velocity adjustment mechanism which adjusts the flow velocity of the air blown, a temperature adjustment mechanism which adjusts temperature, a flow rate adjustment mechanism which adjusts the flow rate, and the like.

The controller 60 controls the display DSP, the loudspeaker 40 and the blower mechanism 50. Further, the controller 60 can calculate out a relative position (coordinates) of an object to be detected with relative to the aerial image I1 and also can detect movement of the object, from results detected with the sensor 30. Based on the detection results of the sensor 30, the controller 60 may control the display DSP, the loudspeaker 40 and the blower mechanism 50. For example, when an object is detected at a predetermined position in the aerial image I1, the controller 60 may output sound from the loudspeaker 40, or may change the display image of the display DSP, or may change the flow velocity, temperature, flow rate and the like of the air blown from the blower mechanism 50.

FIG. 2 is a diagram showing an example of the appearance of the display device 1. In the figure, a direction X, a direction Y and a direction Z are orthogonal to each other, but they may cross at an angle other than 90 degrees.

The display device 1 is configured by using a housing 70. In the example illustrated, the housing 70 has substantially a rectangular parallelepiped shape, which comprises an upper surface 70A parallel to an X-Y plane, etc. In the example illustrated, the upper surface 70A has a rectangular shape which comprises an end 70E extending along the direction X.

The optical element 10 is arranged so that the upper surface 10A and the lower surface 10B are parallel to the X-Y plane. In the example illustrated, the optical element 10 has a rectangular shape which comprises an end 10E extending along the direction X. The optical element 10 and the upper surface 70A are arranged along the direction Y and the end 10E is brought into contact with the end 70E. The display DSP and the retroreflective element 20 are accommodated in the housing 70. The optical element 10 is located directly above the display DSP and the retroreflective element 20 along the direction Z.

The sensor 30 and the air blower outlet 51 are provided in the upper surface 70A. In the example illustrated, the air blower outlet 51 is located between the sensor 30 and the optical element 10 and formed into a slit shape along the end 70E. The air blower outlet 51 is located closer to the optical element 10 as compared to the sensor 30. Along the direction X, a width W51 having such a range that the air blower outlet 51 can be formed is greater than a width WDSP of the display DSP. The sensor 30 is located at substantially a center of the upper surface 70A along the direction X.

Figure 3:
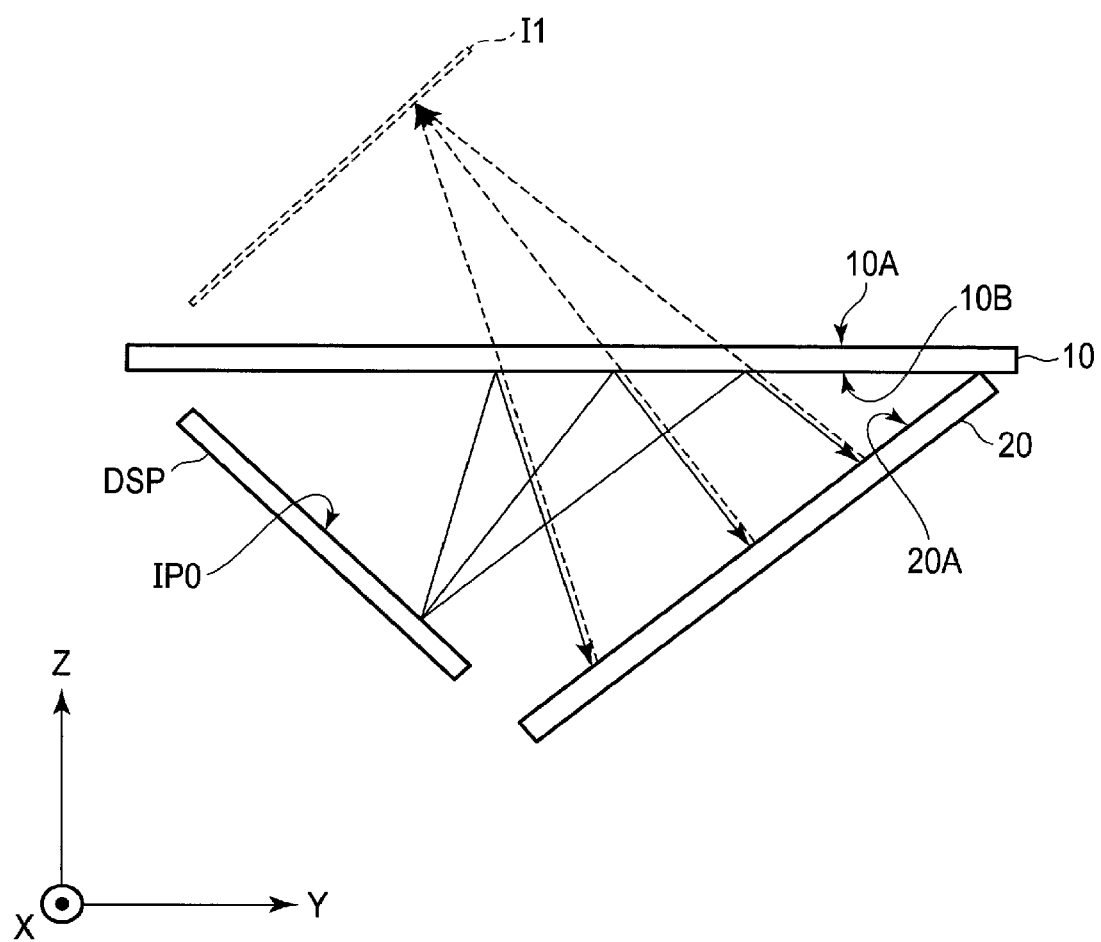
FIG. 3 is a diagram showing an optical path of display light.

FIG. 3 is a diagram showing an optical path of display light. FIG. 3 shows a plane parallel to a Y-Z plane.

The display DSP comprises a display surface IP0 which displays images. Display light emitted from the display surface IP0 is reflected by the optical element 10 toward the retroreflective element 20 as indicated by a solid line in the figure. The reflected light from the optical element 10 enters onto the retroreflective element 20. As indicated by a dotted line in the figure, the reflected light from the optical element 10 is retroreflected by the retroreflective surface 20A towards the optical element 10. The light retroreflected by the retroreflective surface 20A is allowed to pass through the optical element 10 and then imaged as the aerial image I1 which exhibits the display image. The aerial image I1 is located plane-symmetrical to the display surface IP0 with regard to the optical element 10.

Note that the display light may be circularly or linearly polarized light or the like. In this case, the optical element 10 may include a polarization element or a retardation film. When the display light is circularly polarized light, the display device 1 may further include a retardation film.

Figure 4:
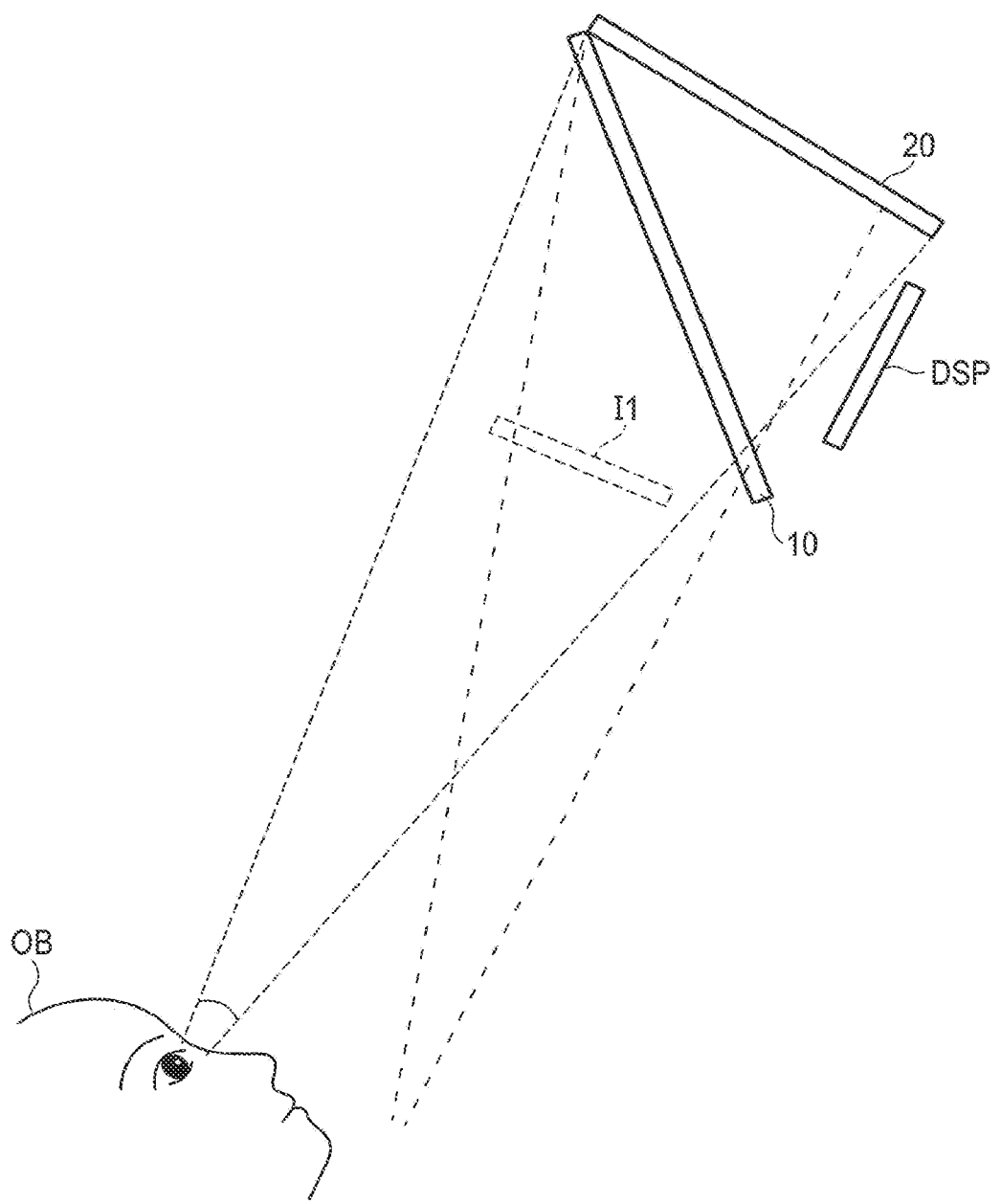
FIG. 4 is a diagram showing position of an observer OB and an aerial image I1 with relative to each other.

FIG. 4 is a diagram showing the positions of the observer OB and the aerial image I1 with relative to each other.

The aerial image I1 is located between the observer OB and the retroreflective element 20. The observer OB is able to observe the aerial image I1 in an observation range (indicated by the dotted line in the figure) including the retroreflective element 20 in a field of view of the observer OB. When the observation range does not overlap the aerial image I1, the aerial image I1 cannot be observed. For this reason, the observer OB can observe the entire aerial image I1 when viewing in a position where the entire aerial image I1 overlaps the observation range. Note that it is desirable that the display DSP should not be located in the observation range.

Figure 5:
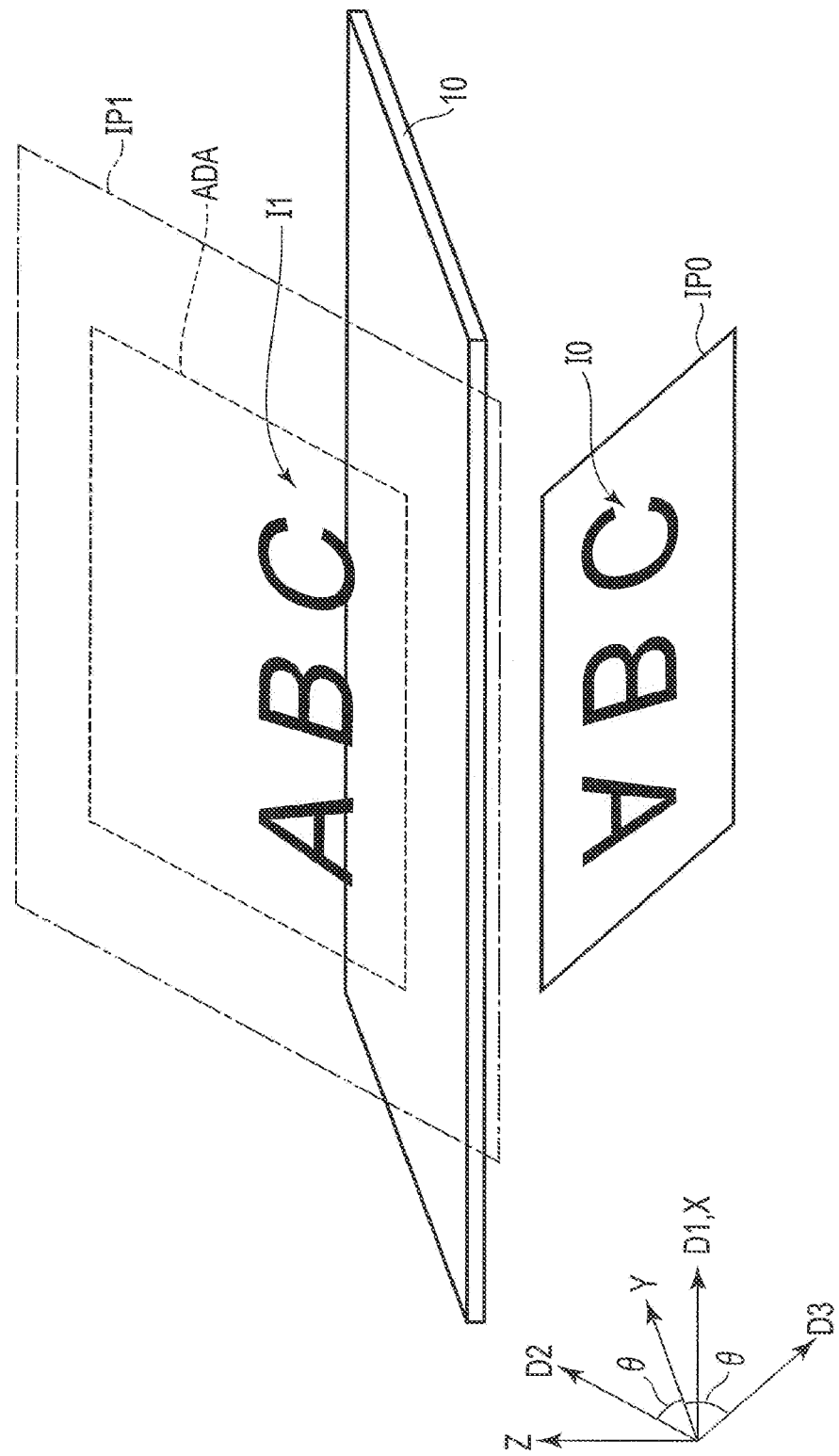
FIG. 5 is a diagram showing positions of a display surface IP0, an aerial display area ADA and an imaged plane IP1 with relative to each other.

FIG. 5 shows the positions of the display surface IP0, the aerial display area ADA, and an imaging plane IP1 with relative to each other.

In the example illustrated, the display surface IP0 has a rectangular shape. The display surface IP0 displays the display image I0. The aerial display area ADA is defined as a region plane-symmetrical to the display surface IP0 with regard to the optical element 10, as indicated by a dashed line. The aerial image I1 is displayed within the aerial display area ADA. Further, the imaging plane IP1 is defined as a plane including the aerial display area ADA, as indicated by an alternate long and short dash line. Therefore, the imaging plane IP1 is plane-symmetrical to the display surface IP0 with respect to the optical element 10.

In this embodiment, the imaging plane IP1 is a plane defined along a direction D1 and a direction D2. The direction D1 corresponds to the direction X. The direction D2 crosses the direction Y at an acute angle θ. That is, the imaging plane IP1 is a plane crossing the X-Y plane or crossing the optical element 10 at the acute angle θ. Further, in this embodiment, the display surface IP0 is a plane defined along the direction D1 and a direction D3. The direction D3 is symmetrical to the direction D2 with regard to the direction Y and crosses the direction Y at the acute angle θ. The display surface IP0 crosses the X-Y plane at an acute angle θ and is plane-symmetrical to the imaging plane IP1 with regard to the optical element 10. In terms of the relationship between the display image I0 and the aerial image I1, the aerial image I1 is inverted upside down with respect to the display image I0 along the direction Z, and is laterally identical to the display image I0 along the direction X.

Figure 6A:
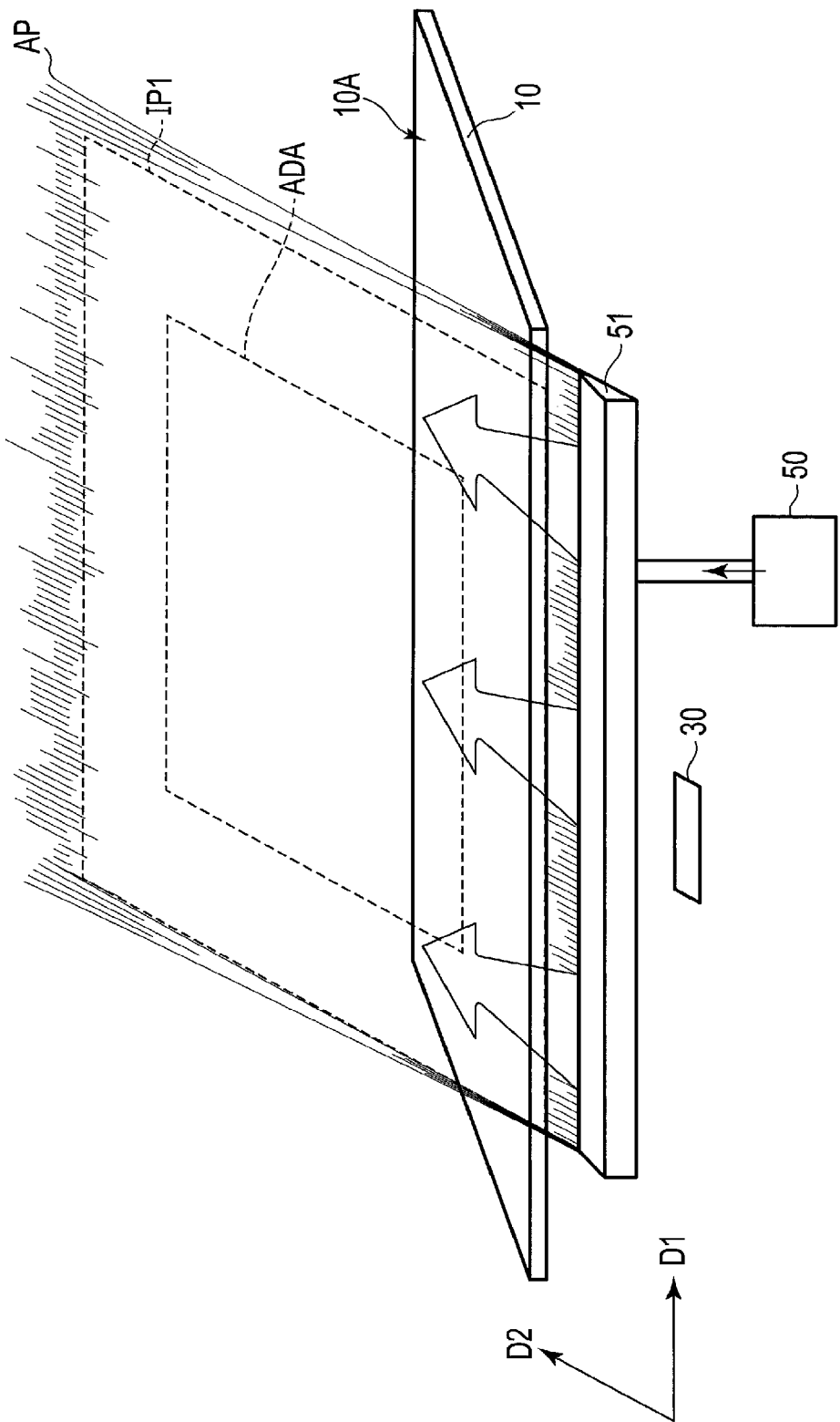
FIG. 6A is a diagram showing an example of arrangement of an air blower outlet.

FIG. 6A shows an arrangement example of the air blower outlet 51.

The air blower outlet 51 is located between the sensor 30 and the aerial display area ADA. That is, the sensor 30, the air blower outlet 51 and the aerial display area ADA are arranged along the direction D2 in this order. The air blower outlet 51 has a slit shape formed along the direction D1. The blower mechanism 50 blows air from the air blower outlet 51 to the region which overlaps the aerial display area ADA. In the example illustrated, the blower mechanism 50 blows air in the direction D2 on an upper surface 10A side of the optical element 10. Here, the air sent from the air blower outlet 51 is substantially parallel to the imaging plane IP1. In other words, the flow of the air blown from the air blower outlet 51 creates an air plate AP of planer air blow on the upper surface 10A side. The air plate AP is formed along the imaging plane IP1. Further, the air plate AP entirely overlaps the aerial display area ADA. Note that the air plate AP should desirably be located within the imaging plane IP1 or on an optical element 10 side with respect to the imaging plane IP1.

FIG. 6B schematically shows a situation where the observer is touching the air plate AP shown in FIG. 6A with his/her finger. When the observer attempts to touch the aerial image I1 in simulation, the observer touches the air plate AP with his/her finger. The observer can obtain the feeling of touching the aerial image I1 by sensing the flow of the air formed in the region where the aerial image I1 is formed as a tactile sensation.

Next, another configuration example of this embodiment will be described with reference to FIGS. 7 to 13.

Figure 7:
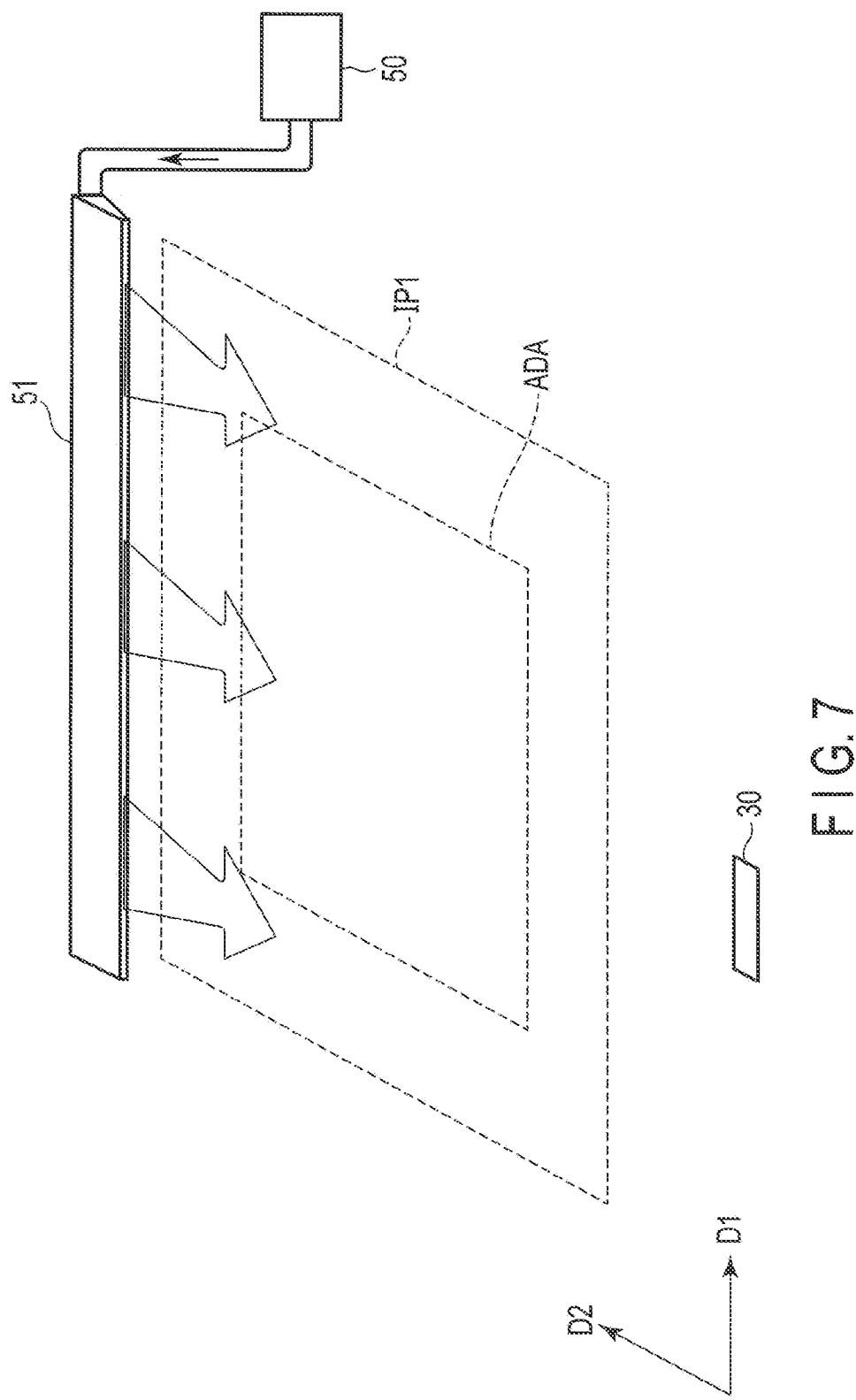
FIG. 7 is a diagram showing another example of arrangement of the air blower outlet.

The configuration example shown in FIG. 7 is different from that of FIG. 6 in that an air blower outlet 51 is located on an opposite side to the sensor 30 over the aerial display area ADA. The blower mechanism 50 blows air from the air blower outlet 51 in a direction opposite to the direction D2, i.e., a direction towards a sensor 30 side.

Figure 8:
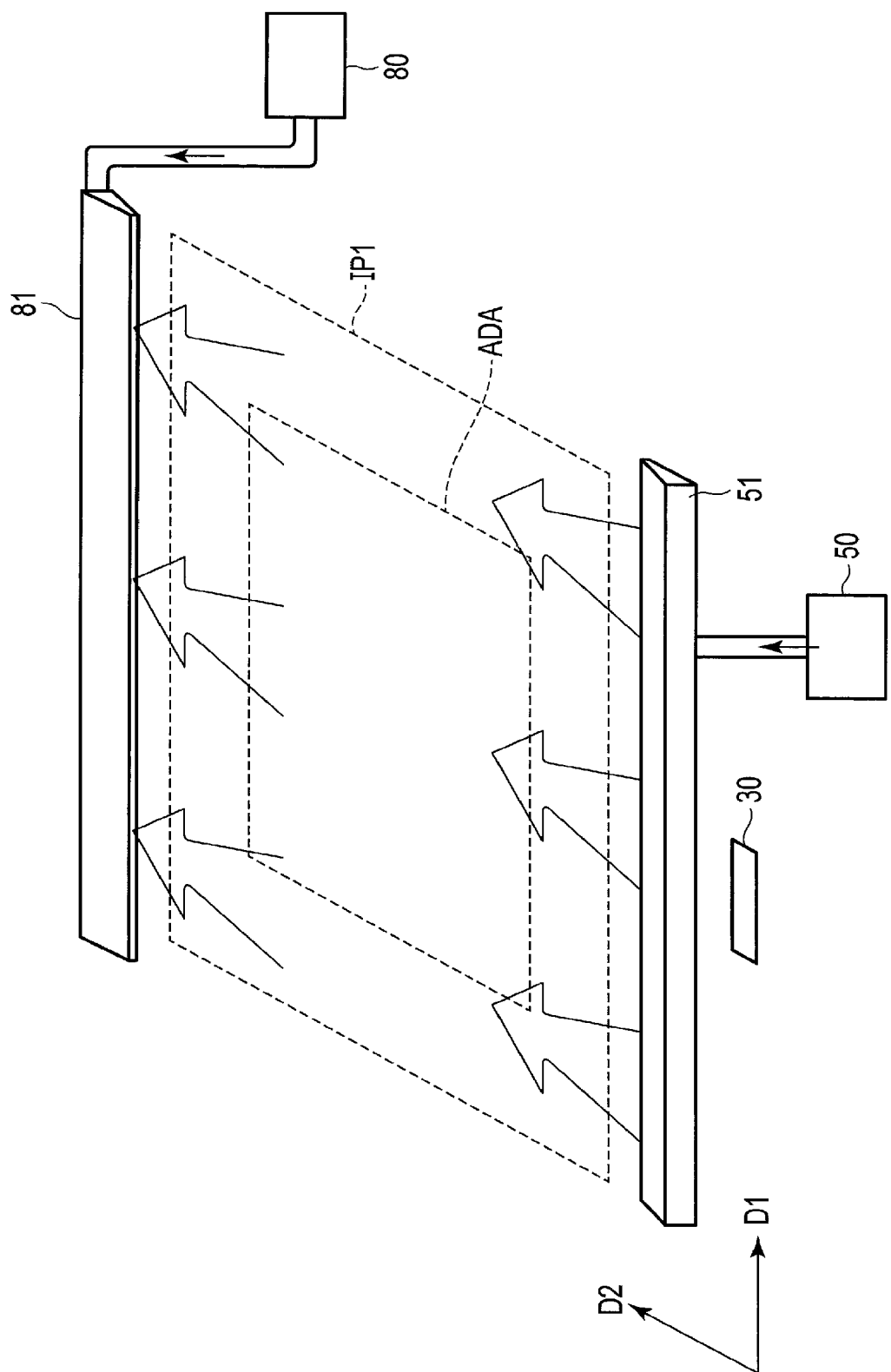
FIG. 8 is a diagram showing another example of arrangement of the air blower outlet.

The configuration example shown in FIG. 8 is different from that of FIG. 6 in further comprising an inlet mechanism 80. An inlet 81 of the inlet mechanism 80 is provided along the direction D1, and opposes the air blower outlet 51 over the aerial display area ADA. With this configuration, between the air blower outlet 51 and the inlet 81, an air flow along the direction D2 is formed.

Figure 9:
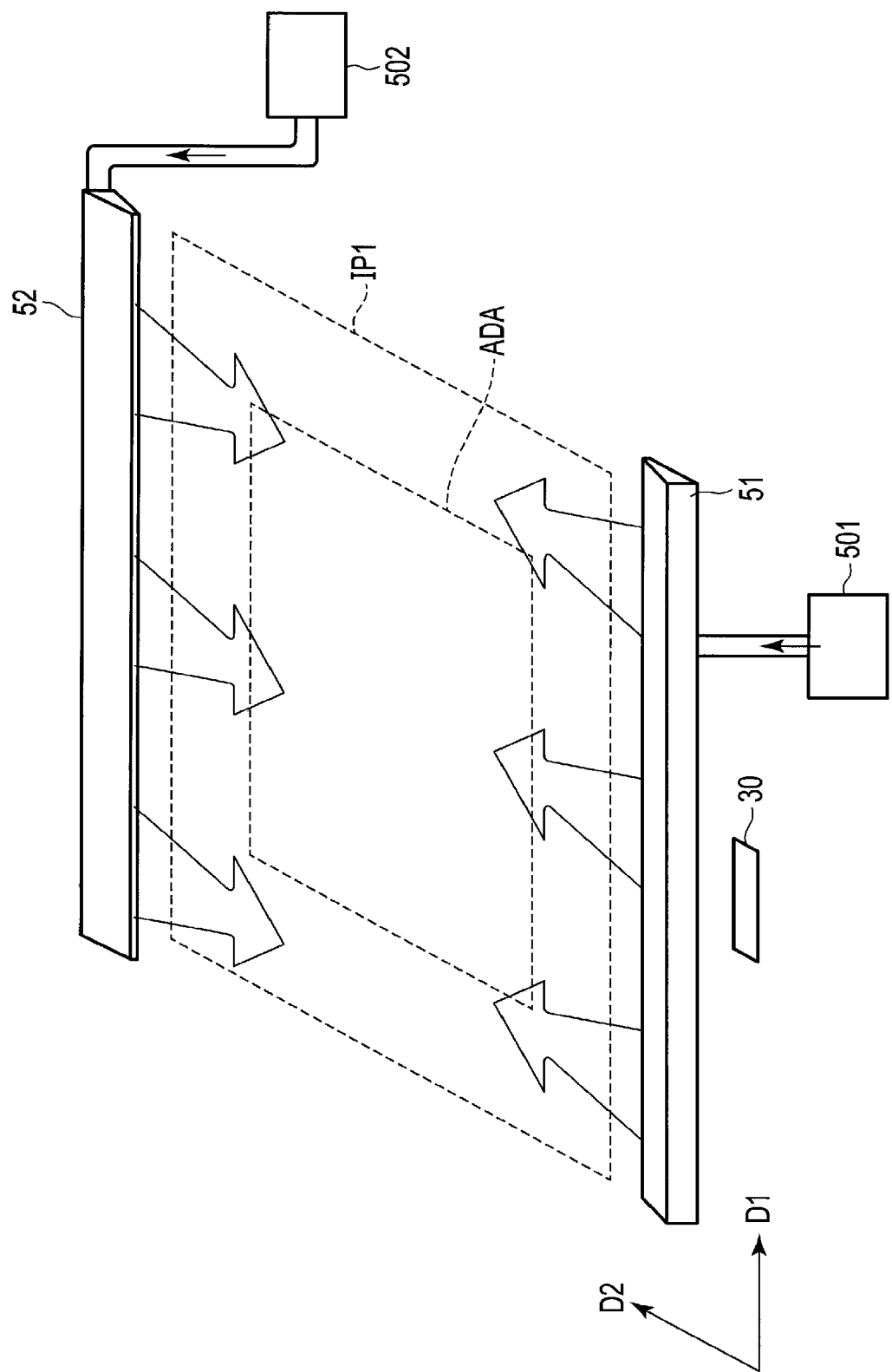
FIG. 9 is a diagram showing another example of arrangement of the air blower outlet.

The configuration example shown in FIG. 9 is different from that of FIG. 6 in comprising an air blower outlet 52 in addition to the air blower outlet 51. The air blower outlet 52 opposes the air blower outlet 51 over the aerial display area ADA. The air blown from the air blower outlet 51 is sent in the direction D2, and the air blown from the air blower outlet 52 is blown in a direction opposite to the direction D2. In other words, the air blower outlet 52 opposes the air blower outlet 51 along the blowing direction (the direction D2) of the air blower outlet 51. In the example illustrated, the air blower outlet 51 is provided in a blower mechanism 501 and the air blower outlet 52 is provided in a blower mechanism 502. With this configuration, the flow velocities, temperatures and flow rates of the airs blown from these blower outlets 51 and 52 can be respectively varied from each other. Note that the blower outlets 51 and 52 may be provided in a common blower mechanism 50.

The configuration example shown in FIG. 10 is different from that of FIG. 6 in that an air blower outlet 51 is provided along the direction D2 and a blower mechanism 501 blows air in the direction D1.

Figure 11:
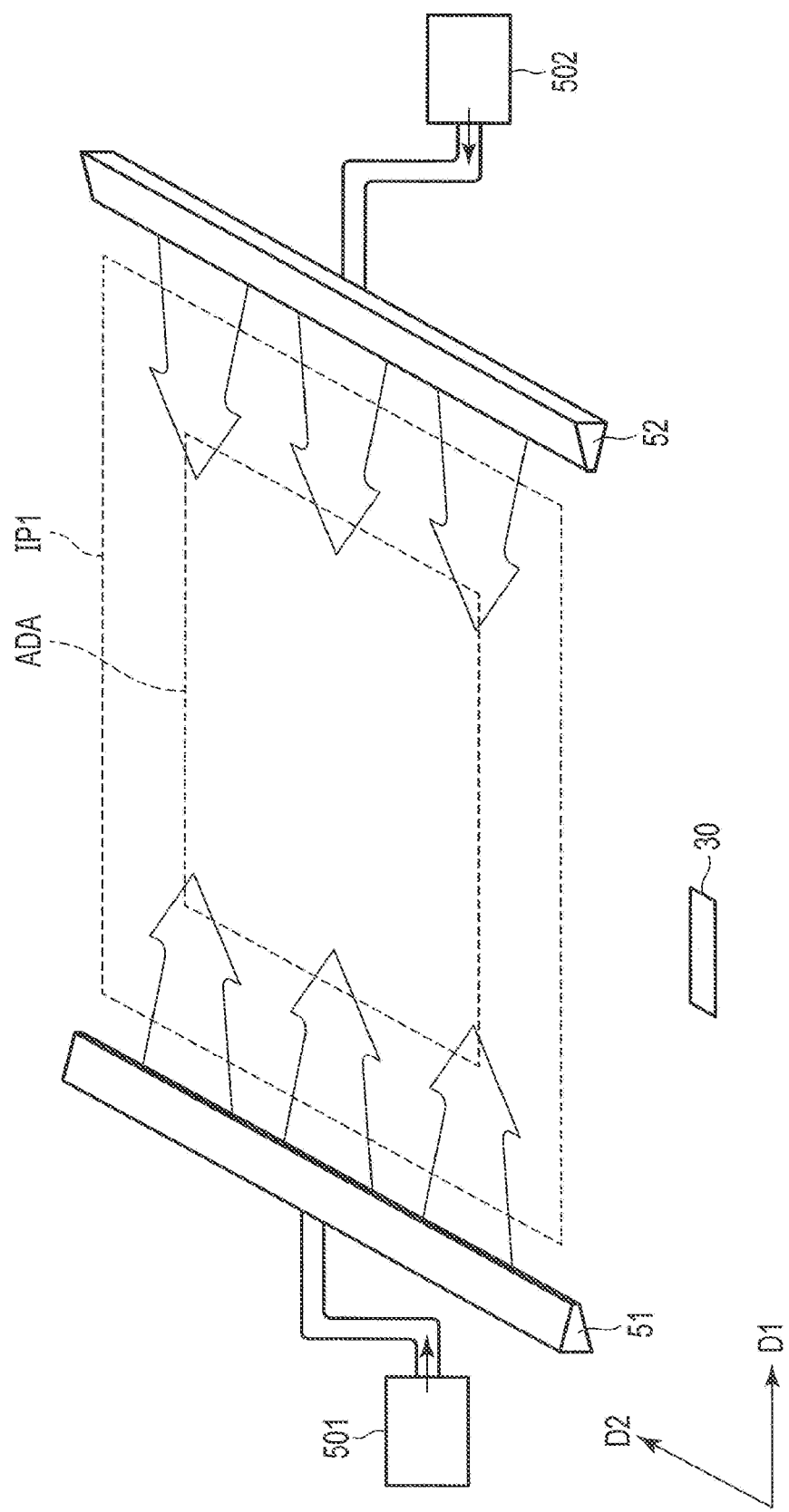
FIG. 11 is a diagram showing another example of arrangement of the air blower outlet.

The configuration example shown in FIG. 11 is different from that of FIG. 10 that an air blower outlet 52 is provided to oppose an air blower outlet 51. The air blower outlet 52 is provided along the direction D2, and opposes the air blower outlet 51 over the aerial display area ADA. The air blown from the air blower outlet 51 is sent in the direction D1 and the air blown from the air blower outlet 52 is sent in a direction opposite to the direction D1.

Figure 12:
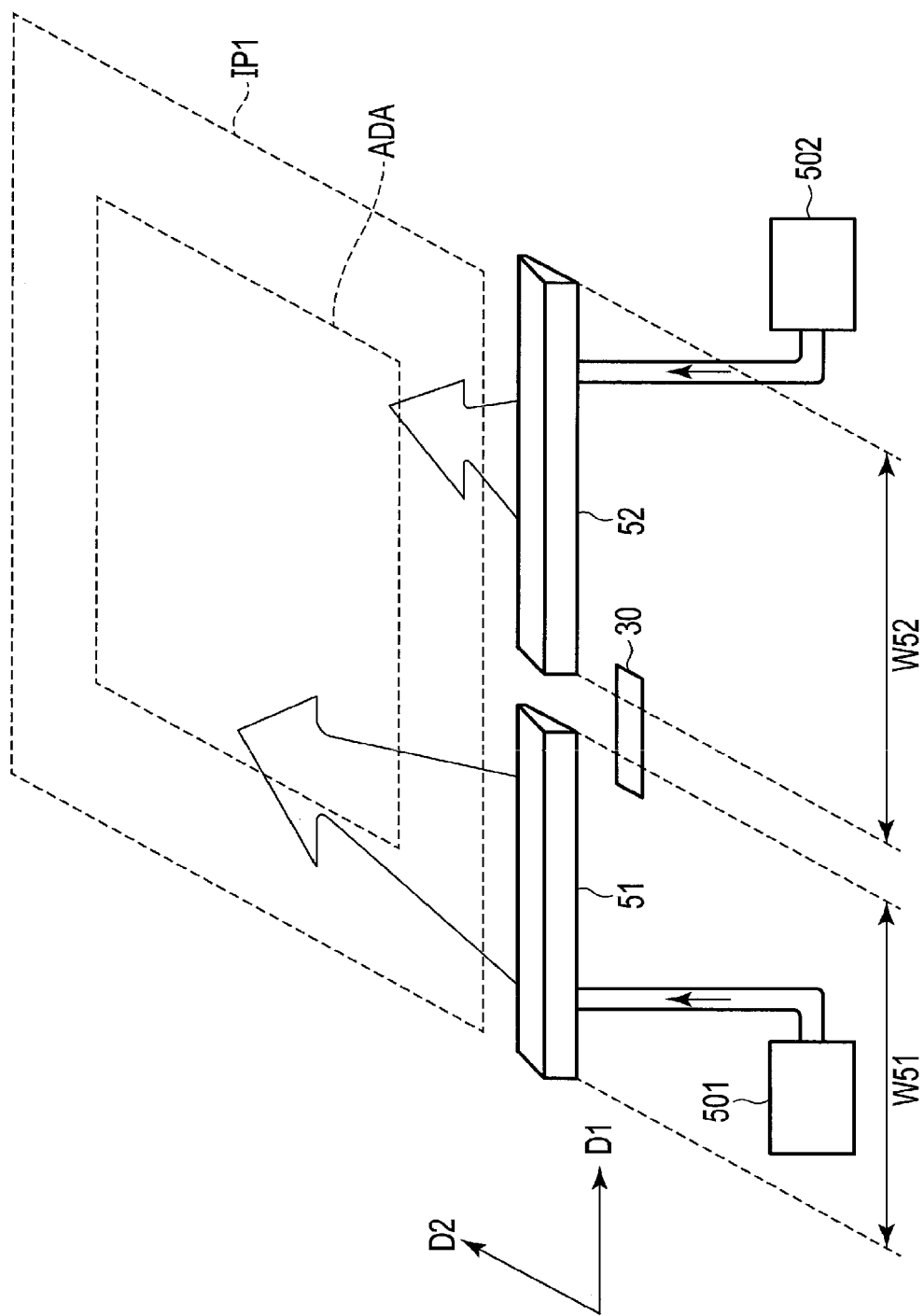
FIG. 12 is a diagram showing another example of arrangement of the air blower outlet.

The configuration example shown in FIG. 12 is different from that of FIG. 6 in that a plurality of air blower outlets, i.e., an air blower outlet 51 and an air blower outlet 52 are arranged in line. In the example illustrated, the air blower outlets 51 and 52 are arranged along the direction D1, but they may be arranged along the direction D2. Further, along the direction D1, a width W51 of the air blower outlet 51 and a width W52 of the air blower outlet 52 are equal to each other, but they may differ. Naturally, three or more air blower outlets may be arranged along one direction. In the example illustrated, the air blower outlet 51 is provided in a blower mechanism 501, and the air blower outlet 52 is provided in a blower mechanism 502. The air blower outlets 51 and 52 may differ from each other in the flow rate, flow velocity and temperature of the airs blown therefrom.

The configuration example shown in FIG. 13 is different from that of FIG. 6 in that a plurality of air blower outlets 51a and 52a are provided around the aerial display area ADA.

In the example illustrated, air blower outlets 51a1, 51a2, 51a3, 51a4, 51a5 and 51a6 are arranged along the direction D1, and the air blower outlets 51a1, 51a2 and 51a3 and the air blower outlet 51a4, 51a5 and 51a6 respectively oppose along the direction D2. The air blower outlets 51a1, 51a2 and 51a3 are provided in a blower mechanism 501A, and the air blower outlet 51a4, 51a5 and 51a6 are provided in a blower mechanism 501B.

The air blower outlets 52a1, 52a2, 52a3, 52a4, 52a5 and 52a6 are arranged along the direction D2, and the air blower outlets 52a1, 52a2 and 52a3 and the air blower outlet 52a4, 52a5 and 52a6 respectively oppose along the direction D1. The air blower outlets 52a1, 52a2 and 52a3 are provided in a blower mechanism 502A, and the air blower outlets 52a4, 52a5 and 52a6 are provided in a blower mechanism 502B.

The air blown from the air blower outlets 51a1, 51a2 and 51a3 is sent in the direction D2, and the air blown from the air blower outlets 51a4, 51a5 and 51a6 is sent in a direction opposite to the direction D2.

The air blown from the air blower outlets 52a1, 52a2 and 52a3 is sent in the direction D1, and the air blown from the air blower outlet 52a4, 52a5 and 52a6 is sent in a direction opposite to the direction D1.

In the configuration example shown in FIG. 13, the flow rate, flow velocity, temperature, etc., of the airs blown from the air blower outlets 51a and 52a can be varied as needed.

FIG. 14 schematically shows the blower mechanism 50.

The blower mechanism 50 is provided near the display DSP. The blower mechanism 50 comprises an air blower outlet 51, a fan 53 and a duct 54. In the example illustrated, the display DSP is a liquid crystal display, and comprises a liquid crystal display panel PNL and a light source (backlight) LS. In this embodiment, the fan 53 is used for cooling the light source LS. That is, the fan 53 blows air towards the light source LS. The wind sent by the fan 53 is blown out from the air blower outlet 51 through the duct 54 while cooling down the light source LS. In the example illustrated, the duct 54 and the air blower outlet 51 are formed as one integral unit, but they may be prepared individually and the put together.

FIG. 15 is a perspective view schematically showing a display device 1 comprising blower mechanisms. FIG. 15 shows only the main portion. In the example illustrated, the display device 1 comprises blower mechanisms 501 and 502. The blower mechanisms 501 and 502 can blow airs respectively which differ in the flow rate, flow velocity, temperature, etc. Note that the display device 1 may comprise one blower mechanism or three or more. The blower mechanisms 501 and 502 each comprise a fan 53, a duct 54 and an air blower outlet 51, but they may comprise a plurality of fans 53, ducts 54 and air blower outlets 51. The outlets of the blower mechanism 501 and 502 can be formed to correspond to the air blower outlets 51 and 52 shown in, for example, FIGS. 9, 11, 12, etc. With this configuration, the blower mechanisms 501 and 502 for cooling display DSP can also function to form an air plate AP, and thus the device can be downsized and the cost can be reduced as compared to the case where a separate blower mechanism is provided.

FIG. 16 shows an example of the aerial image I1 displayed on the aerial display area ADA.

In the example illustrated, a button A, a button B and a button C are displayed as the aerial image I1. Let us suppose now that a finger of the observer OB as an object to be detected approaches the button A. The sensor 30 detects the location and movement of the object. The controller 60 judges whether the object is located in the region where the button A is displayed in the aerial display area ADA, further whether the object makes the movement of pushing the button A and the like, based on the detection result of the sensor 30. When judged that the object has made the movement of touching or pushing the button A, the controller 60 controls the display DSP to change the display image of the aerial image I1. For example, the aerial image I1 is changed to such display image showing the button A is pushed into the back side of the aerial display area ADA as viewed from the observer OB. Further, the controller 60 controls the loudspeaker 40 in synchronous with the change of the aerial image I1, and instructs to output a sound effect for pushing the button A. At this time, as described above, air flow is produced in the area of the aerial image I1, which includes the region where the button A is displayed. Thus, if a finger is placed on the region where the button A is displayed, the observer can perceive the operation by the airflow on the finger as a tactile sensation and also visually by the change of the display image. Further, he or she can auditorily perceive it by the output of sound. In this manner, the feeling of "having touched the button A" can be reinforced for the observer.

Figure 17:
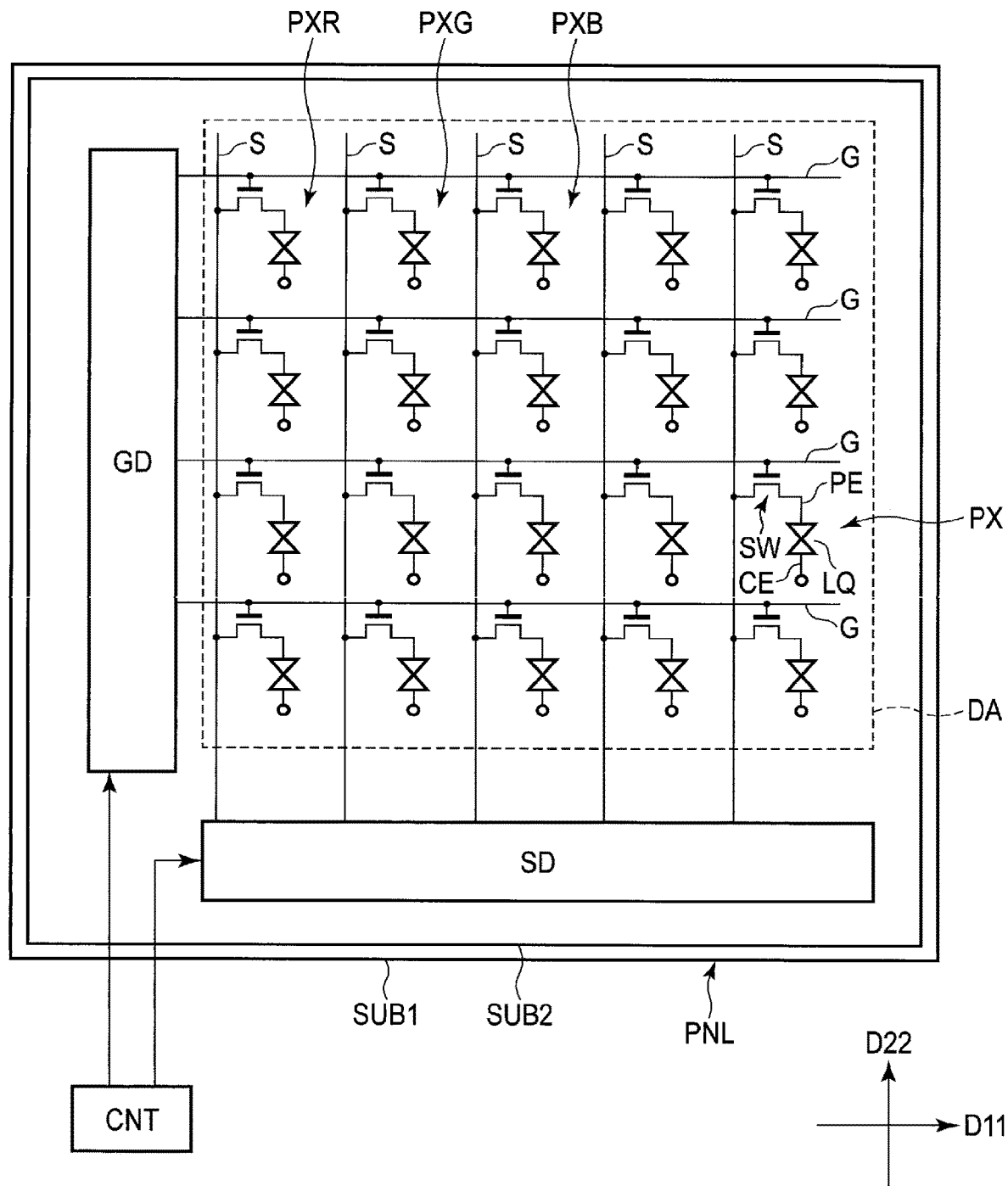
FIG. 17 is a diagram showing a configuration example of the display panel shown in FIG. 14.

FIG. 17 is a diagram showing a configuration example of the display panel PNL shown in FIG. 14. Here, an active matrix-driving transmissive type liquid crystal display panel will be described as an example of the display panel PNL. More specifically, the display panel PNL comprises a first substrate SUB1, a second substrate SUB2 opposing the first substrate SUB1 and a liquid crystal layer LQ held between the first substrate SUB1 and the second substrate SUB2. The first substrate SUB1 and second substrate SUB2 are attached together while a predetermined cell gap is formed therebetween. The display panel PNL comprises a display area DA which displays images. The display area DA comprises a plurality of subpixels PX arranged in a matrix.

The display area DA comprises, as subpixels PX, for example, a red pixel PXR which displays red, a green pixel PXG which displays green and a blue pixel PXB which displays blue. Note that the display area DA may further comprise a subpixel of a color different from red, green or blue (that is, for example, a white pixel which displays white). The pixels which realize color presentation comprises subpixels PX of these plurality of different colors. That is, a pixel discussed here is the minimum unit which forms a color image. In the example illustrated, the pixels each comprise a red pixel PXR, a green pixel PXG and a blue pixel PXB.

The red pixel PXR comprises a red color filter and is formed to be trasnmissive mainly to red light of the white light from the respective light source. The green pixel PXG comprises a green color filter and is formed to be trasnmissive mainly to green light of the white light from the respective light source. The blue pixel PXB comprises a blue color filter and is formed to be trasnmissive mainly to blue light of the white light from the respective light source among the white light from light source. Although will not be explained in full detail, the color filters may be provided on the first substrate SUB1 or on the second substrate SUB2.

The first substrate SUB1 comprises a plurality of gate lines G extending along a first direction D11 and a plurality of source lines S extending along a second direction D22 while crossing the gate lines G. The gate lines G are each drawn to an outer side of the display area DA and connected to the gate driver GD. The source lines S are each drawn to an outer side of the display area DA and connected to the source driver SD. The gate drivers GD and the source drivers SD are connected to the controller CNT. The controller CNT generates control signals based on the video signals, and controls the gate driver GD and the source driver SD.

The subpixels PX each comprise a switching element SW, a pixel electrode PE, a common electrode CE and the like. The switching element SW is electrically connected to a gate line G and a source line S. The switching element SW is formed from a thin film transistor, for example. The pixel electrode PE is electrically connected to the switching element SW. The common electrode CE opposes a plurality of pixel electrodes PE.

Although a detailed explanation of the structure of the display panel PNL is omitted here, in a display mode using a vertical electric field along the normal of the main surface of the substrate or using an inclined electric field at an oblique direction to the normal of the substrate main surface, the pixel electrodes PE are provided on the first substrate SUB1, whereas the common electrode CE is provided on the second substrate SUB2. In a display mode using a lateral electric field along the substrate main surface, both of the pixel electrodes PE and the common electrode CE are provided on the first substrate SUB1. Further, the display panel PNL may have such a structure as to be able to correspond to a display mode using an appropriate combination of the vertical, lateral and inclined electric fields, described above. Note that the main surface of the substrate is equivalent to a plane defined by the first direction D11 and the second direction D22.

Figure 18:
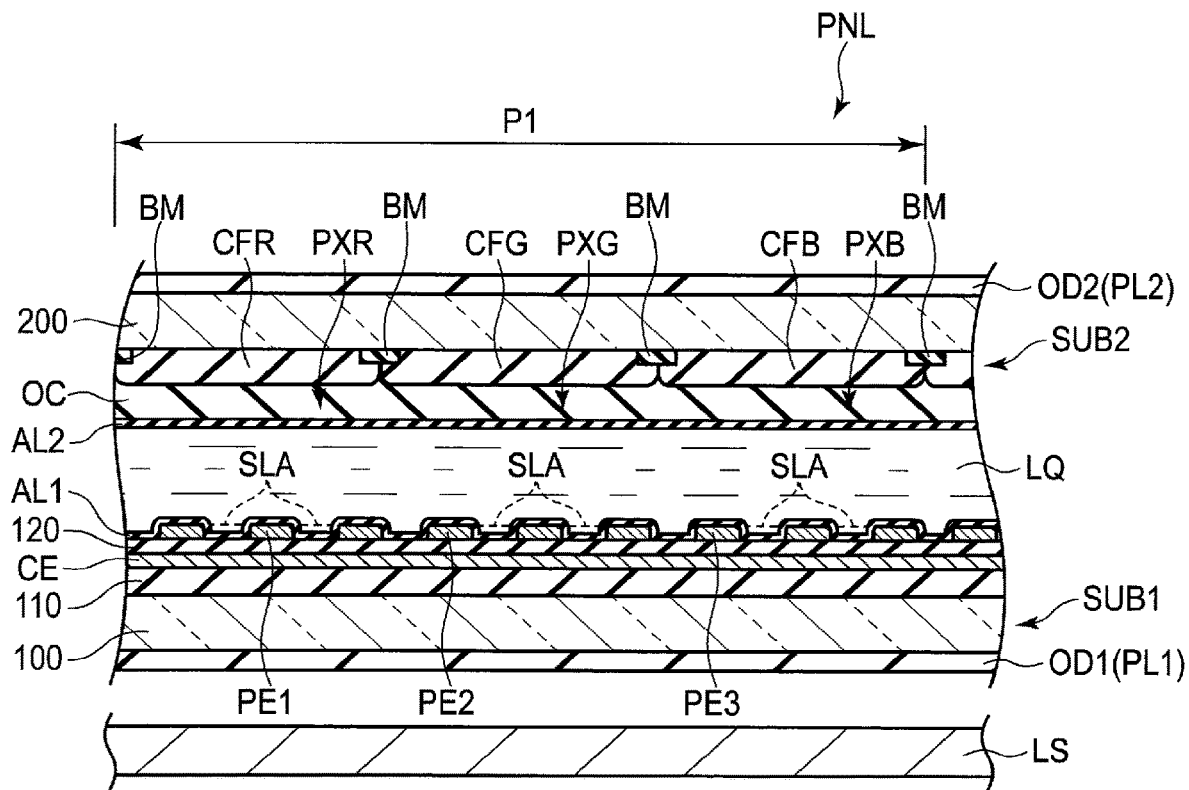
FIG. 18 is a cross section showing a configuration example of the display panel shown in FIG. 17.

FIG. 18 is a cross section showing a configuration example of the display panel PNL shown in FIG. 17. Here, a cross-sectional structure of the display panel PNL to which an fringe field switching (FFS) mode is applied, which is one of the display modes using the lateral electric field, will be briefly described.

The first substrate SUB1 comprises a first insulating substrate 100, a first insulating film 110, a common electrode CE, a second insulating film 120, pixel electrodes PE1 to PE3, a first alignment film AL1 and the like. The common electrode CE extends over the red pixel PXR, the green pixel PXG and the blue pixel PXB. A pixel electrode PE1 of the red pixel PXR, a pixel electrode PE2 of the green pixel PXG and a pixel electrode PE3 of the blue pixel PXB each oppose the common electrode CE, and each comprise slits SLA. In the example illustrated, the common electrode CE is located between the first insulating film 110 and the second insulating film 120, and the pixel electrodes PE1 to PE3 are located between the second insulating film 120 and the first alignment film AL1. Note that the pixel electrodes PE1 to PE3 may be located between the first insulating film 110 and the second insulating film 120 and the common electrode CE may be located between the second insulating film 120 and first alignment film AL1. In this case, the slits SLA are formed in the common electrode CE.

The second substrate SUB2 comprises a second insulating substrate 200, a light-shielding layer BM, color filters CFR, CFG and CFB, an overcoat layer OC, a second alignment film AL2 and the like. The color filters CFR, CFG and CFB oppose the pixel electrodes PE1, PE2 and PE3, respectively, while interposing the liquid crystal layer LQ between each pair. The color filter CFR is a red filter, the color filter CFG is a green filter and the color filter CFB is a blue filter. In the example illustrated, the color filter CFR, CFG and CFB are provided in the second substrate SUB2, but they may be provided in the first substrate SUB1.

The liquid crystal layer LQ is enclosed between the first alignment film AL1 and the second alignment film AL2.

The light source LS opposes the first substrate SUB1. The light source LS may take various implementable applications, but a detailed explanation of the structure is omitted.

A first optical element OD1 including a first polarizer PL1 is disposed on an external surface of the first insulating substrate 100. A second optical element OD2 including a second polarizer PL2 is disposed on an external surface of the second insulating substrate 200. For example, a first absorption axis of the first polarizer PL1 and a second absorption axis of the second polarizer PL2 are orthogonal to each other.

The pixels each containing a red pixel PXR, a green pixel PXG and a blue pixel PXB are arranged at a pitch P1.

Figure 19:
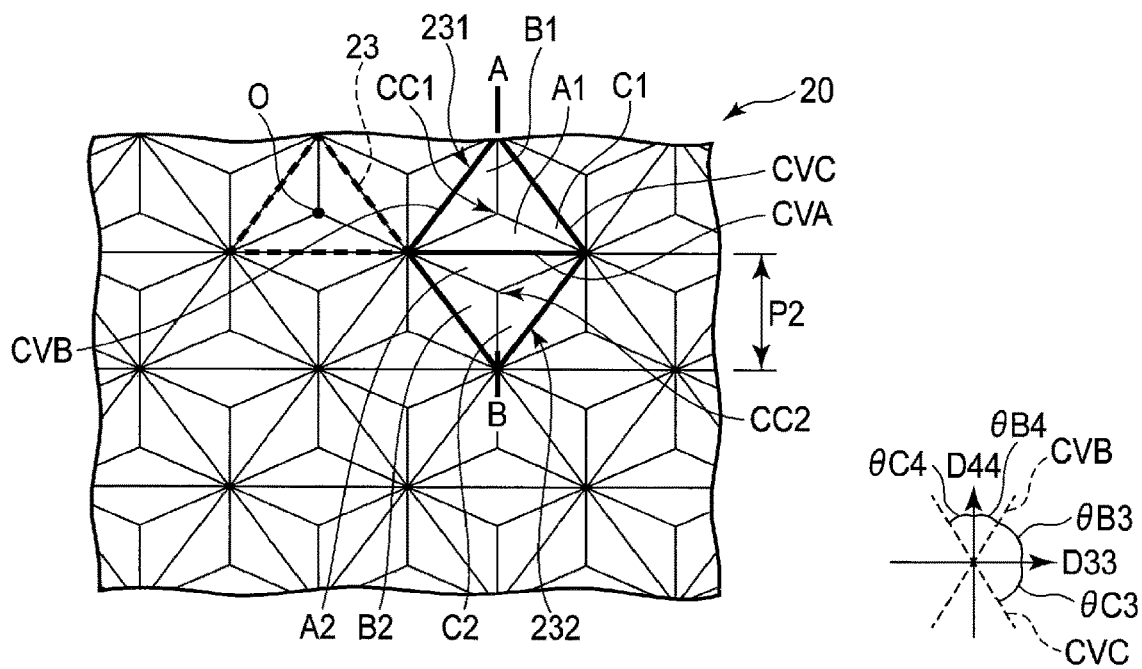
FIG. 19 is a plan view diagram showing a configuration example of the retroreflective element shown in FIG. 1.

FIG. 19 is a plan view showing a configuration example of the retroreflective element 20 shown in FIG. 1. Here, the illustration is shown along a plane defined by a third direction D33 and a fourth direction D44 orthogonal to each other.

The retroreflective element 20 comprises a plurality of retroreflectors 23. In the illustrated plan view, the retroreflectors 23 each has an outline of an equilateral triangle. Further, in each of the retroreflectors 23, a center O is depressed toward the back of the page to form a concavity CC in the retroreflective surface 20A shown in FIG. 1. Moreover, the boundary between each adjacent pair of retroreflectors 23 is indicated by a dotted line in FIG. 19, and is equivalent to a convexity CV of the retroreflective surface 20A. The retroreflectors 23 are arranged along the third direction D33. Further, the retroreflectors 23 are arranged at a pitch P2 along the fourth direction D44. The retroreflectors 23 adjacent to each other along the third direction D33 and the fourth direction D44 are inversed with respect each other at 180 degrees.

A retroreflector 231 in the figure comprises three reflective surfaces A1, B1 and C1 orthogonal to each other. The retroreflector 231 comprise a concavity CC1 surrounded by the reflective surfaces A1, B1 and C1. The retroreflector 231 and a retroreflector 232 are arranged along the fourth direction D44. The retroreflector 232 comprises three reflective surfaces A2, B2 and C2 orthogonal to each other. The retroreflector 232 comprises a concavity CC2 surrounded by the reflective surface A2, B2 and C2. An intersection between the reflective surface A1 of the retroreflector 231 and the reflective surface A2 of the retroreflector 232 forms a convexity CVA of the retroreflective surface. The convexity CVA extends along a direction parallel to the third direction D33. The retroreflector 231 and the retroreflector 232 are line-symmetrial to each other with respect to the convexity CVA. Similarly, the boundary between each adjacent pair of retroreflectors 23 corresponds to a convexity. That is, the outline (triangle) of each of the retroreflectors 23 is defined by the convexity. The outline of the retroreflector 231 is defined by convexities CVA, CVB and CVC. The convexitys CVB and CVC each extend along a direction crossing the third direction D33 and the fourth direction D44. For example, the extending direction of the convexity CVB makes an angle with the third direction D33 at θB3 of 60 degrees, and an angle with the fourth direction D44 at θB4 of 30 degrees. The extending direction of the convexity CVC makes an angle with the third direction D33 at θC3 of 60 degrees, and an angle with the fourth direction D44 at θC4 of 30 degrees.

The resolution of the aerial image I1 is dependent on the pitch P2 of the retroreflectors 23. In order to suppress degradation of resolution, the pitch P2 should desirably be less than the pitch P1 of the pixels in the display panel PNL shown in FIG. 3.

FIG. 20 is a perspective view showing a configuration example of a retroreflector 23 shown in FIG. 19. Here, an xyz coordinate system is applied, in which the axes are orthogonal to each other, to illustrate the form of the retroreflector 23.

More specifically, the retroreflector 23 comprises three reflective surfaces 23A, 23B and 23C in the xyz coordinate system. The reflective surfaces 23A to 23C are all identical in shape and are right-angled isosceles triangles. Further, the reflective surfaces 23A to 23C are arranged to be orthogonal to each other. The retroreflector 23 comprising the reflective surfaces 23A to 23C of such a form is called a corner cube or a corner reflector.

When a point A on an x-axis is represented by (α, 0, 0), a point B on a y-axis by (0, α, 0) and a point C on a z axis by (0, 0, α), the reflective surface 23A is formed on an x-y plane and is defined by an origin point O, the point A and the point B. The reflective surface 23B is formed on a y-z plane and is defined by the origin point O, the point B and the point C. The reflective surface 23C is formed on an x-z plane and is defined by the origin point O, the point A and the point C. A line segment AB which connects the point A and the point B, a line segment BC which connects the point B and the point C and a line segment AC which connects the point A and the point C correspond to the convexity described above.

The retroreflector 23 does not comprise a surface defined by the three points A, B and C. That is, the inner side surrounded by the three reflective surfaces 23A to 23C is equivalent to the concavity described above and is an air layer. The retroreflector 23 can realize retroreflection, in which incident light rays are reflected by the three reflective surfaces 23A to 23C, respectively, to reflect back in substantially the same optical paths as those of the incident light rays. But, the vicinities of the three points A, B and C may be non-retroreflective portions (where the light is not reflected by the three reflective surfaces).

Note that the form of the retroreflectors 23 is not limited to that of the example illustrated here, but may be such a form similar to that of the retroreflector but the non-retroreflective portions thereof are cut off.

FIG. 21 is a cross section showing configuration examples of a retroreflective element 20 applicable to this embodiment.

The retroreflective element 20 comprises a base 21 and a metal thin film 22. The base 21 is formed from, for example, a resin material. The metal thin film 22 is formed from, for example, a material which exhibits light reflexivity, such as silver (Ag), aluminum (Al), or an aluminum alloy. Note that the metal thin film 22 may be subjected to a surface treatment to prevent corrosion or coated with an inorganic material such as silicon nitride (SiN).

A configuration example shown in FIG. 21, part (a) comprises a retroreflective surface 20A on a front surface 21A side of the base 21. The metal thin film 22 covers the surface 21A of the base 21 and forms a retroreflective surface 20A. A rear surface 21B of the base 21 is flat. As indicated an arrow in the figure, incident light entering the retroreflective element 20 is reflected by the retroreflective surface 20A without passing through the base 21.

A configuration example shown in FIG. 21, part (b) comprises a retroreflective surface 20A on a rear surface 21B side of the base 21. The metal thin film 22 covers the rear surface 21B of the base 21, and forms a retroreflective surface 20A. A front surface 21A of the base 21 is flat. As indicated an arrow in the figure, incident light entering the retroreflective element 20 passes through the base 21, and thereafter, is reflected by the retroreflective surface 20A.

A configuration example shown in FIG. 21, part (c) comprises a retroreflective surface 20A on an interface between a base 21 and a cover member 24. The base 21 and the cover member 24 are formed respectively from materials having refractive indexes different from each other, and at least the cover member 24 has a light transmissivity. The retroreflective surface 20A is formed of a metal thin film 22 provided between the base 21 and the cover member 24. As indicated an arrow in the figure, incident light entering the retroreflective element 20 passes through the cover member 24, and thereafter, is reflected by the retroreflective surface 20A.

When the base 21 is formed from a material exhibiting light reflectivity, the metal thin film 22 may be omitted, and the front surface 21A or rear surface 21B of the base 21 may form the retroreflective surface 20A. The transmissivity in the retroreflective surface 20A is substantially zero, and most of the incident light entering the retroreflective surface 20A does not reach the rear surface 20B of the retroreflective element 20. That is, most incident light entering the retroreflective element 20 is retroreflected by the retroreflective surface 20A without passing through the base 21.

In each of the above-described embodiments, the blower mechanisms 50, 501 and 501A correspond to the first blower mechanism. The blower mechanisms 502 and 502A correspond to the second blower mechanism. The air blower outlet 51 corresponds to the first air blower outlet. The air blower outlet 52 corresponds to the second air blower outlet. Further, the air blower outlet 51a corresponds to the third air blower outlet, and the air blower outlet 51b corresponds to the fourth air blower outlet. The air blower outlet 52a corresponds to the fifth air blower outlet, and the air blower outlet 52b corresponds to the sixth air blower outlet. The direction D1 correspond to the first direction and the direction D2 corresponds to the second direction. Further, the direction D2 corresponds to the air blowing direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
  a display comprising a display surface which emits display light;
  a retroreflective element which retroreflects a part of the display light;
  an optical element comprising a lower surface opposing the display and the retroreflective element and an upper surface on an opposite side to the lower surface, which reflects the part of the display light toward the retroreflective element and transmits the part of the display light retroreflected by the retroreflective element;
  a sensor which detects an object to be detected, located on the upper surface;
  a blower mechanism comprising a duct, a fan blowing air to cool the display from an one end of the duct, and an air blower outlet formed in other end of the duct and extending along a first direction, the blower mechanism blowing air to a side of the upper surface; and
  a controller, wherein
  an outer surface of the duct is in contact with a back surface of the display,
  the outer surface extends from a lower end of the back surface to an upper end of the back surface,
  the optical element, the air blower outlet, and the sensor are arranged in order in a direction crossing the first direction, a first width of the air blower outlet along the first direction is larger than a second width of the display along the first direction, the air blower outlet creates an air plate of planer air blow which entirely overlaps an aerial display area located plane-symmetrical to the display surface with regard to the optical element, and the controller changes at least one of a temperature, and amounts of air blown from different blower mechanisms differently based on the detection of the object by the sensor.

2. The display device of claim 1, the blower mechanism blows air between the aerial display area and the optical element.

3. The display device of claim 1, further comprising:

a loudspeaker which outputs sound, wherein the controller which controls the loudspeaker to output the sound based on the detection of the object by the sensor.

4. The display device of claim 1, wherein the controller which changes display image on the display based on the detection of the object by the sensor.

5. The display device of claim 1, wherein the blower mechanism blows air along an imaging plane that is located to be the plane-symmetrical to the display surface with regard to the optical element.

6. The display device of claim 1, further comprising an inlet mechanism comprising an inlet extending along the first direction and opposing the air blower outlet, wherein the aerial display area is located between the air blower outlet and the inlet.

7. The display device of claim 6, wherein a third width of the inlet along the first direction is larger than a fourth width of the aerial display area along the first direction.

* * * * *